(12) United States Patent
Lee et al.

(10) Patent No.: US 10,432,534 B2
(45) Date of Patent: Oct. 1, 2019

(54) METHOD AND DEVICE FOR TRANSMISSION CONTROL IN WIRELESS COMMUNICATION SYSTEM

(71) Applicant: Samsung Electronics Co., Ltd., Gyeonggi-do (KR)

(72) Inventors: Jin-Sung Lee, Seoul (KR); Jung-Shin Park, Seoul (KR); Han-Na Lim, Seongnam-si (KR); Beom-Sik Bae, Suwon-si (KR); Hyung-Ho Lee, Seoul (KR); Joo-Hyung Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 15/508,864

(22) PCT Filed: Aug. 27, 2015

(86) PCT No.: PCT/KR2015/008986
§ 371 (c)(1),
(2) Date: Mar. 3, 2017

(87) PCT Pub. No.: WO2016/036055
PCT Pub. Date: Mar. 10, 2016

(65) Prior Publication Data
US 2017/0279725 A1    Sep. 28, 2017

(30) Foreign Application Priority Data
Sep. 4, 2014    (KR) .................. 10-2014-0117787

(51) Int. Cl.
*H04L 12/801* (2013.01)
*H04W 28/14* (2009.01)
(Continued)

(52) U.S. Cl.
CPC ............ *H04L 47/14* (2013.01); *H04L 5/0055* (2013.01); *H04L 5/0057* (2013.01);
(Continued)

(58) Field of Classification Search
CPC ......... H04L 47/14; H04L 69/16; H04L 47/30; H04L 47/193; H04L 5/0057; H04L 5/0055; H04W 28/14
See application file for complete search history.

(56) References Cited

U.S. PATENT DOCUMENTS 8,369,221 B2   2/2013   Racz et al.
8,379,575 B2   2/2013   Terry et al.
(Continued)

FOREIGN PATENT DOCUMENTS

KR    20030016144 A    2/2003

OTHER PUBLICATIONS

Szilveszter Nadas, et al., "Providing congestion control in the Iub Transport Network for HSDPA," Published in: Global Telecommunications Conference, 2007. GLOBECOM '07. IEEE, DOI: 10.1109/GLOCOM.2007.1003, 2007, 5 pages publisher IEEE, Piscataway, NJ.
(Continued)

*Primary Examiner* — Thai Nguyen

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). According to various embodiments, a device of an intermediate node comprises: a receiving unit configured to receive a signal for determining a buffer threshold value of at least one terminal; and a control unit configured to determine a buffer threshold value of the terminal on the basis of the signal, and determine a size of data to be requested to at least one server
(Continued)

according to the determined buffer threshold value of the terminal.

18 Claims, 22 Drawing Sheets

(51) Int. Cl.
    *H04W 88/18*     (2009.01)
    *H04L 5/00*     (2006.01)
    *H04L 12/835*     (2013.01)
    *H04L 29/06*     (2006.01)

(52) U.S. Cl.
    CPC ............ *H04L 47/193* (2013.01); *H04L 47/30* (2013.01); *H04L 69/16* (2013.01); *H04W 28/14* (2013.01); *H04W 88/18* (2013.01)

(56) References Cited

U.S. PATENT DOCUMENTS

| | | | |
|---|---|---|---|
| 8,432,806 B2 | 4/2013 | Fu | |
| 2001/0021197 A1 | 9/2001 | Foore et al. | |
| 2003/0103460 A1* | 6/2003 | Kamath | H04L 47/10 370/236.2 |
| 2005/0033879 A1 | 2/2005 | Hwang et al. | |
| 2005/0053038 A1* | 3/2005 | Kimura | H04L 1/0021 370/333 |
| 2009/0028104 A1 | 1/2009 | Jung | |
| 2009/0201813 A1 | 8/2009 | Speight | |
| 2012/0039169 A1 | 2/2012 | Susitaival et al. | |
| 2012/0213070 A1 | 8/2012 | Lee et al. | |
| 2012/0250678 A1 | 10/2012 | Sabella et al. | |
| 2012/0265897 A1 | 10/2012 | Das et al. | |
| 2013/0142044 A1* | 6/2013 | Terry | H04L 47/10 370/230 |
| 2013/0194924 A1 | 8/2013 | Zhang et al. | |

OTHER PUBLICATIONS

Haiqing Jiang, et al., "Tackling bufferbloat in 3G/4G networks," Nov. 14-16, 2012, pp. 329-342 publisher IMC'12, Boston, MA.
3GPP TS 36.304 V8.2.0, "3rd Generation Partnership Project; Technical Specification Group Radio Access Network; Evolved Universal Terrestrial Radio Access (E-UTRA); User Equipment (UE) procedures in idle mode," (Release 8), Technical Specification, (May 2008), 27 pages, publisher 3GPP, Sophia Antipolis, Valbonne—France.
3GPP TS 25.214 V8.9.0, "3rd Generation Partnership Project; Technical Specification Group Radio Access Network; Physical layer procedures (FDD)," (Release 8), Technical Specification, (Mar. 2010), 94 pages, publisher 3GPP, Sophia Antipolis, Valbonne—France.
3GPP TS 36.331 V8.0.0, "3rd Generation Partnership Project; Technical Specification Group Radio Access Network; Evolved Universal Terrestrial Radio Access (E-UTRA) Radio Resource Control (RRC); Protocol specification," (Release 8), Technical Specification, (Dec. 2007), 56 pages, publisher 3GPP, Sophia Antipolis, Valbonne—France.
All about Wired and Wireless Technology, "Transport Block Size, Throughput and Code rate," downloaded Feb. 21, 2017, 3 pages, available at http://4g-lte-world.blogspot.kr/2012/12/transport-block-size-code-rate-protocol.html.
Junxian Huang, et al., "An In-depth Study of LTE: Effect of Network Protocol and Application Behavior on Performance," Aug. 12-16, 2013, pp. 363-374, publisher ACM.
"TCP Header Format," Connected: An Internet Encyclopedia, downloaded Feb. 21, 2017, 4 pages, available at http://www.freesoft.org/CIE/Course/Section4/8.htm.
Foreign Communication from Related Counterpart Application; European Patent Application No. 15838819.9; Extended European Search Report and European Search Opinion dated Mar. 14, 2018; 6 pages.
European Patent Office, "Communication pursuant to Article 94(3) EPC," Application No. EP15838819.9, dated Jan. 25, 2019, 4 pages.

* cited by examiner

METHOD AND DEVICE FOR TRANSMISSION CONTROL IN WIRELESS COMMUNICATION SYSTEM

CROSS-REFERENCE TO RELATED APPLICATIONS AND CLAIM OF PRIORITY

The present application claims priority under 35 U.S.C. § 365 to International Patent Application No. PCT/KR2015/008986, which was filed on Aug. 27, 2015, entitled "METHOD AND DEVICE FOR TRANSMISSION CONTROL IN WIRELESS COMMUNICATION SYSTEM," and claims priority to Korean Patent Application 10-2014-0117787, which was filed on Sep. 4, 2014, each of which are incorporated herein by reference into the present disclosure as if fully set forth herein.

TECHNICAL FIELD

The present invention relates to a method and an apparatus for controlling transmission in a wireless communication system.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Conventionally, mostly, a method for controlling transmission is to focus on the maximization of a throughput based on Transmission Control Protocol/Internet Protocol (TCP/IP). Particularly, as the TCP/IP widely used in a wired data communication network is extended to a wireless network, there occurs a problem of serious degradation of transmission performance in a TCP connection which does not appear in a wired network. That is, since it is difficult to achieve a high throughput due to the mobility of a user equipment and a time-varying characteristic of a wireless channel, various methods have been proposed for accurately estimating a state of the wireless channel or rapidly recovering from a low throughput. However, techniques for maximizing a throughput cause an unnecessarily excessive transmission delay by injecting exceedingly many packets into a network, and the unnecessarily excessive transmission delay is a main cause which makes it difficult to provide a service sensitive to a transmission delay in a cellular network environment.

Since the prior art cannot properly reflect a change in a Round-Trip Time (RTT) depending on a state change of a wireless channel, although a situation of the wireless channel becomes worse, there may occur a problem of the degradation of transmission performance in the RTT-based prior art which depends on a case where a minimum RTT value still maintains a small value, the problem that it is difficult to distribute a fair throughput when a base station directly receives data from multiple servers, or the problem that it is impossible to make a differentiation between throughputs which is based on weights among multiple services with respect to one user equipment.

Currently, a requirement for low latency performance for a new 5G service is increasing, and there is a need for a solution in terms of a transmission control protocol for ensuring low latency performance. Also, currently, since a mismatch between design purposes for a TCP and a cellular network deepens a queueing delay of the cellular network, there is a need for a throughput control technique for solving this problem.

DISCLOSURE OF THE INVENTION

Technical Problem

An embodiment of the present invention provides an apparatus and a method for controlling transmission with an intermediate node as the center in a wireless communication system.

Another embodiment of the present invention provides an apparatus and a method for controlling transmission on the basis of transmission delay performance in a wireless communication system.

Still another embodiment of the present invention provides an apparatus and a method for reducing a buffer waiting time period generated in a network.

Yet another embodiment of the present invention provides an apparatus and a method for achieving fairness between services on the basis of the preference of a user.

Solution to Problem

In accordance with an aspect of the present invention, an apparatus of a base station in a wireless communication system is provided. The apparatus includes a receiver configured to receive a signal for determining a buffer threshold of each user equipment; and a controller configured to determine the buffer threshold for each user equipment based on the signal and to determine a size of data to be requested to a server, according to the determined buffer threshold for each user equipment.

In accordance with another aspect of the present invention, an apparatus of a user equipment in a wireless communication system is provided. The apparatus includes a receiver configured to receive data from a base station; and a controller configured to generate a signal for determining a buffer threshold for each user equipment by using a delay time period of the received data.

In accordance with still another aspect of the present invention, an apparatus of a server in a wireless communication system is provided. The apparatus includes a storage unit configured to store a sojourn time period of data in a queue for each user equipment of the server; and a controller configured to generate a signal for determining a buffer threshold for each user equipment based on the sojourn time period of the data in the queue for each user equipment.

In accordance with yet another aspect of the present invention, a method of an apparatus of a base station in a wireless communication system is provided. The method includes receiving a signal for determining a buffer threshold of each user equipment; determining the buffer threshold for each user equipment based on the signal; and determining a size of data to be requested to a server, according to the determined buffer threshold for each user equipment.

In accordance with still yet another aspect of the present invention, a method of an apparatus of a user equipment in a wireless communication system is provided. The method includes receiving data from a base station; and generating a signal for determining a buffer threshold for each user equipment by using a delay time period of the received data.

In accordance with further another aspect of the present invention, a method of an apparatus of a server in a wireless communication system is provided. The method includes storing a sojourn time period of data in a queue for each user equipment of the server; and generating a signal for determining a buffer threshold for each user equipment based on the sojourn time period of the data in the queue for each user equipment.

Advantageous Effects of Invention

According to embodiments of the present invention, transmission control adaptive to a state change of a wireless channel can be performed, a delay requirement between services can be satisfied, and weighted fairness depending on priorities among services can be achieved. Also, transmission control which reflects the preference of a user can be performed.

BEST MODE FOR CARRYING OUT THE INVENTION

Hereinafter, exemplary embodiments of the present invention will be described in detail with reference to the accompanying drawings. Also, in the following description of the present invention, a detailed description of related known configurations or functions incorporated herein will be omitted when it may make the subject matter of the present invention rather unclear.

Hereinafter, in the present invention, a technique for controlling transmission will be described.

Terms referring to network entities, a term referring to data transmission, a term referring to a transport layer, and the like, which are used in the following description, are for convenience of description. Accordingly, the present invention is not limited by the terms set forth below, and another term referring to a subject having an equivalent technical meaning may be used.

In the present invention, the user equipment may be a portable electronic device, and may be one of a smart phone, a portable terminal, a mobile phone, a mobile pad, a media player, a tablet computer, a handheld computer, and a Personal Digital Assistant (PDA). Also, the user equipment may be a device having a combination of two or more functions of the above-described devices.

With respect to a transmission control technique of a base station for ensuring a short delay time period according to the present invention, a case of performing a direct transmission control function by a base station in a cellular network which does not use TCP/IP, and a case of controlling an existing TCP/IP network and a network, which does not use the TCP/IP network, to operate in conjunction with each other will be described as examples. Networks according to the present invention may include not only the cellular network and the TCP/IP network but also another network for performing communication.

Figure 1:
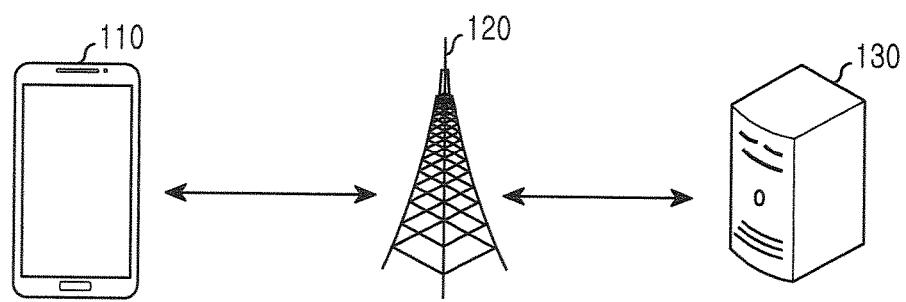
FIG. 1 illustrates an example of a communication method between main communication agents in a wireless communication system.

FIG. 1 illustrates an example of a communication method between main communication agents in a wireless communication system.

An intermediate node according to the present invention may include a base station, a repeater, and a user equipment, and hereinafter, the base station will be described as an example of the intermediate node.

In the present invention, the user equipment 110 includes an apparatus for transmitting/receiving data or a message, and the base station 120 includes an apparatus capable of connecting a network to the user equipment for a wireless communication service.

In the present invention, a server refers to a device that allows an operator to provide a particular service to a subscriber of a service. Specifically, the server according to the present invention may refer to a device for providing a service which is provided to only a user who subscribes to a particular service in a particular network. The server according to the present invention is not limited to providing the particular service, but includes an apparatus for providing a service to a client in the network.

In a wireless communication system, the base station 120 receives data from the server 130 and delivers the received data to the user equipment 110, and thereby, data is delivered. When data is transmitted from the server 130 to the user equipment 110, if control over the data is not performed, a delay caused by the congestion of the network may occur, and moreover, the loss of data may occur when a supportable buffer amount is exceeded. In the present invention, in order to minimize the occurrence of a delay in the network, the base station controls transmission with the base station as the center.

Figure 2A:
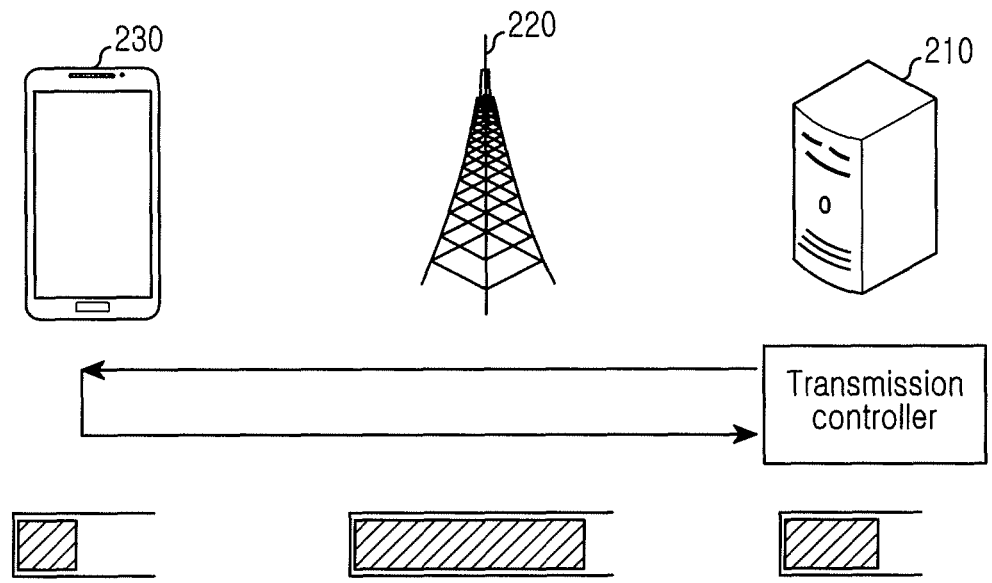
FIGS. 2A and 2B illustrate an embodiment of information transmission control according to a main control agent in a wireless communication system.
Figure 2B:
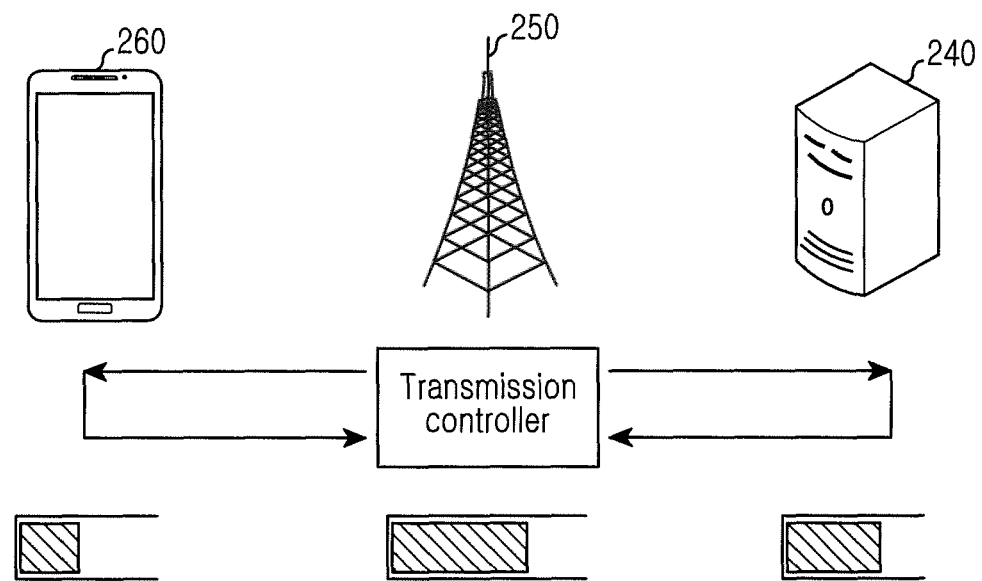

FIGS. 2A and 2B illustrate an embodiment of information transmission control according to a main control agent in a wireless communication system.

FIG. 2A illustrates an example of typical End-to-End (E2E) transmission control, and FIG. 2B illustrates an example of a method for controlling transmission with a base station as the center in a wireless communication system according to an embodiment of the present invention. The transmission control refers to the transmission of data after the size of data to be transmitted to the user equipment and a time period during which data is to be transmitted are determined.

Referring to FIG. 2A, in the case of the E2E transmission control method, a server 210 takes charge of transmission control. The E2E transmission control method causes as much data as possible to be transmitted to a network until the congestion of the network occurs. In the E2E transmission control method, RTT is changed according to a channel state, and thus, a transmission control operation may be inefficiently performed. For example, when an RTT change is large, unnecessary TCP timeout may be caused and a throughput may be reduced. The E2E transmission control method is problematic in that a user equipment 230 and a base station 220 need to perform feedback to the server, in that it is difficult to directly control network buffering delay, and in that it is difficult to control fairness among multiple services within one user equipment.

Referring to FIG. 2B, differently from the the E2E transmission control method, in the base station-centered transmission control method, a base station 250 existing on a data transmission path takes charge of transmission control. In the base station-centered transmission control, when the base station 250 receives data from a server 240 and transmits the data to a user equipment 260, the size of the received data and that of the transmitted data are differently determined according to a situation. For example, in the situation, consideration is given to a state of a current buffer in a case where data is transmitted from the base station 250 to the user equipment 260, a state of a buffer in a case where data is transmitted from the server 240 to the base station 250, a Modulation and Coding Selection (MCS) level measured by the base station 250, and the like.

Figure 3:
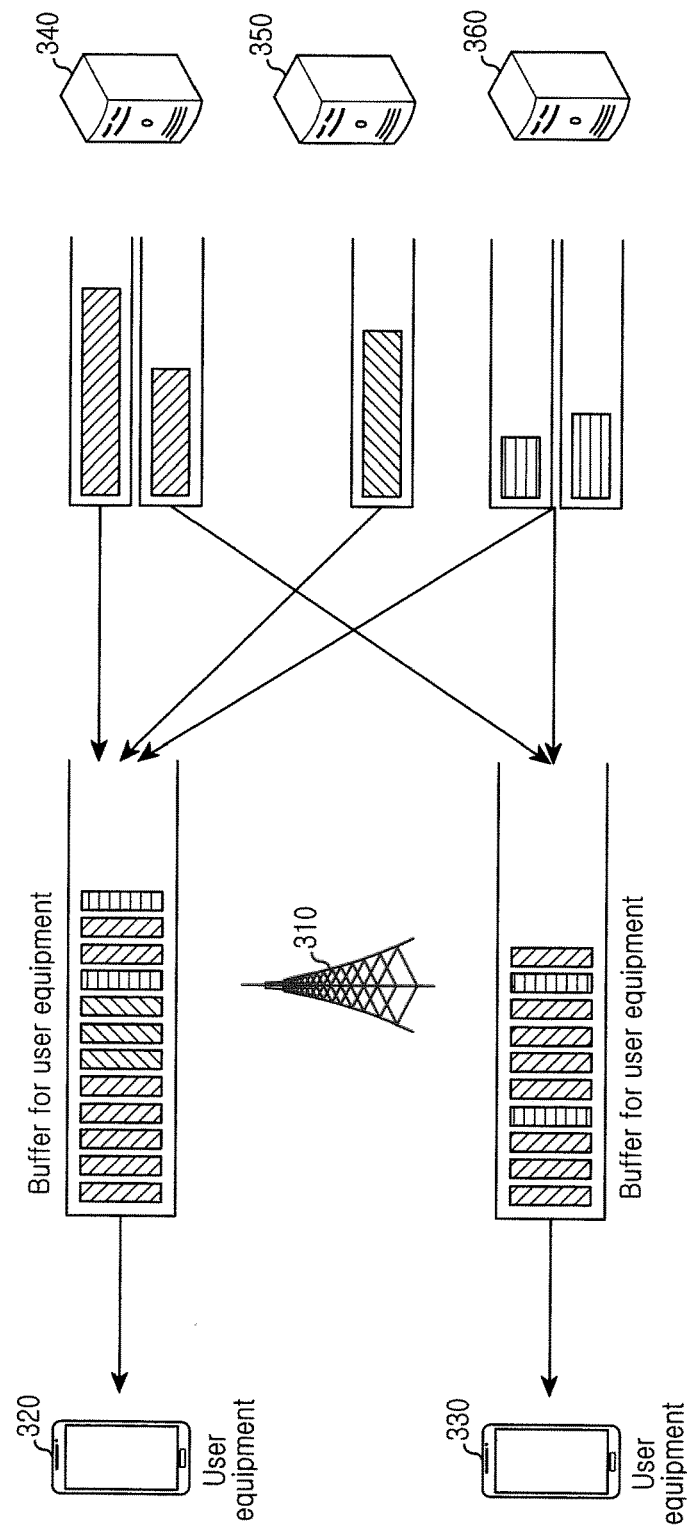
FIG. 3 illustrates an example of a system model for controlling transmission with an intermediate node as the center according to an embodiment of the present invention.

FIG. 3 illustrates an example of a system model for controlling transmission with an intermediate node as the center according to an embodiment of the present invention.

Referring to FIG. 3, in order to control transmission, a base station 310 determines a buffer threshold of a buffer for each of user equipments 320 and 330, and determines the size of data to be transmitted on the basis of the buffer threshold determined for each of the user equipments 320 and 330. Also, according to an embodiment of the present invention, the base station 310 may request the size of data to be received from each of servers 340, 350, and 360, and may request a time period during which the data is to be received from each of servers 340, 350, and 360. Further, the base station 310 may determine a server to which the base station 310 is to send a request for data among the servers 340, 350, and 360.

The buffer refers to an area in which data stays which does not arrive at the user equipments 320 and 330 due to a difference in a transmission rate between the base station 310 and the user equipments 320 and 330 although a transmission request has been made when the base station 310 has transmitted data to the user equipments 320 and 330. A threshold may be set for the buffer in order to manage the buffer, and the threshold for the buffer may be set to be different for each user equipment since a situation of transmission and reception of data may be different for each user equipment. In the following description, causing data to wait in the buffer may be used in the same sense as that of queueing.

In order to determine a threshold for a buffer for each of the user equipments 320 and 330, the base station 310 may receive information directly from each of the user equipments 320 and 330, and may determine the threshold of the buffer for each of the user equipments 320 and 330 on the basis of a delayed time period. The base station 310 may receive information directly from each of the servers 340, 350, and 360, and may determine the threshold of the buffer for each of the user equipments 320 and 330 on the basis of a delayed time period. The base station 310 may determine the threshold of the buffer for each of the user equipments 320 and 330 on the basis of a state of a wireless channel between the base station 310 and the user equipments 320 and 330 and a sojourn time period during which data stays in the buffer for each of the user equipments 320 and 330.

In order to control transmission on the basis of the buffer threshold for each of the user equipments 320 and 330, the base station 310 may set the size of requested data, which depends on priorities among multiple servers, to be different for each server by using a weighting parameter for achieving a transmission rate different for each service. Alternatively, when the amount of data waiting in the buffer is less than the threshold, the base station 310 may increase the size of the requested data. Alternatively, when the amount of the data waiting in the buffer is greater than the threshold, the base station 310 may reduce the size of the requested data.

Figure 4:
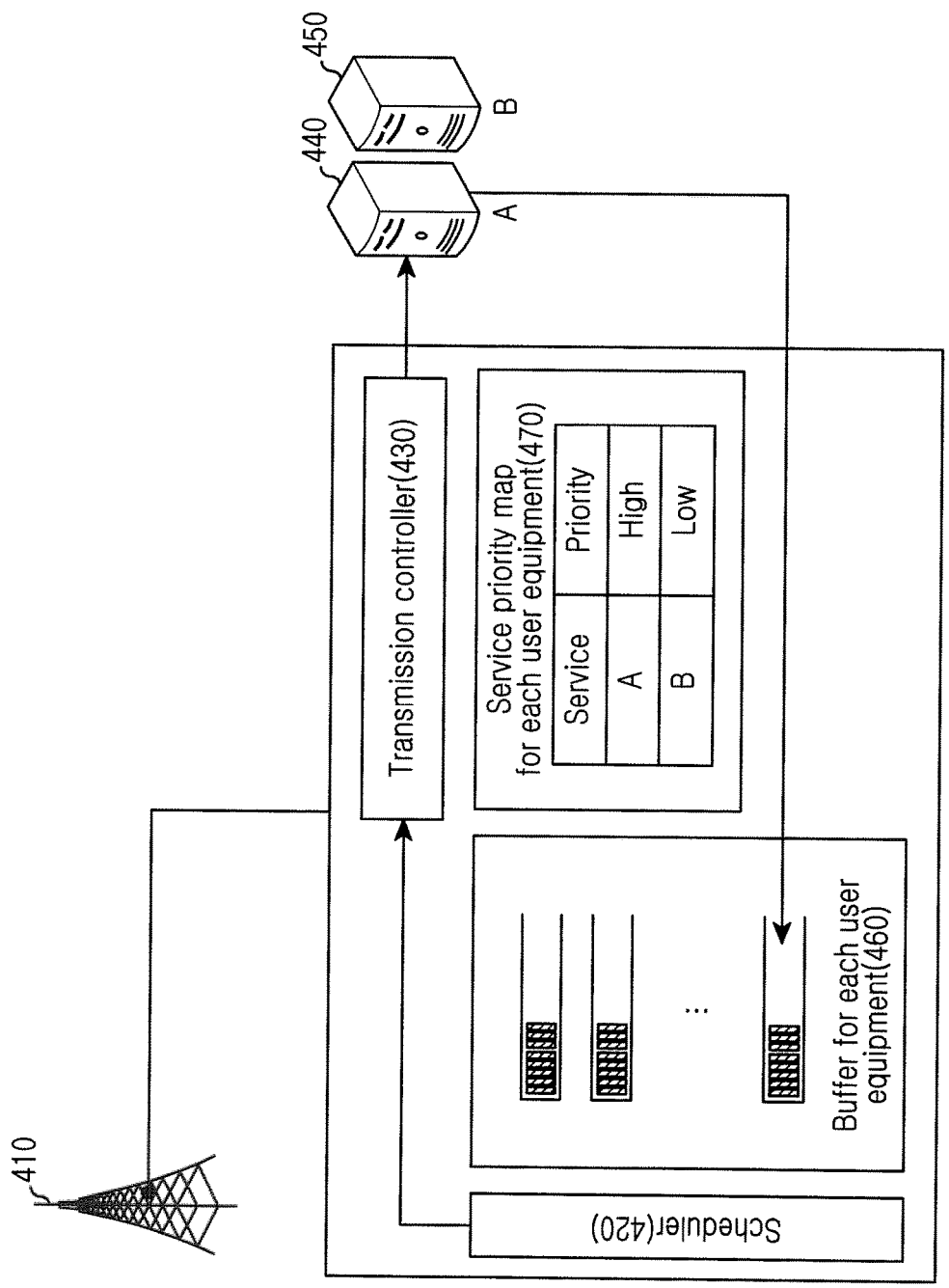
FIG. 4 illustrates an example of a configuration of a base station in a wireless communication system according to an embodiment of the present invention.

FIG. 4 illustrates an example of a configuration of a base station in a wireless communication system according to an embodiment of the present invention.

Referring to FIG. 4, the base station 410 includes a scheduler 420, a transmission controller 430, and a priority map 470. The scheduler 420 may receive a feedback from a user equipment, and may dynamically allocate resources to the user equipment. Particularly, the scheduler 420 according to the present invention may provide the transmission controller 430 with information on the user equipment. The transmission controller 430 determines the size of data for which the transmission controller 430 is to send a request to servers 440 and 450. The transmission controller 430 may receive the information directly from the user equipment. Alternatively, the transmission controller 430 may receive a time period, which is delayed by each of the servers 440 and 450, from each of the servers 440 and 450. Alternatively, the transmission controller 430 may adjust a buffer threshold for each user equipment by using internal information of the base station, and may then determine data, for which the transmission controller 430 is to send a request to the server, by comparing data waiting in a current buffer with the threshold.

Also, the transmission controller 430 may determine a server, to which the transmission controller 430 is to send a request for data, by using the service priority map 470 for each user equipment. The transmission controller 430 may receive priority information on a service from the user equipment, may store a priority map, and may make a request for data in such a manner as to receive the data from a server that provides a service having a high priority.

When receiving data request information from the transmission controller 430, each of the servers 440 and 450 determines the size of data and a time period, during which the data is to be transmitted, according to the request of the transmission controller 430, and transmits the data to the base station 410. The base station 410 receives the data from each of the servers 440 and 450, stores the received data in a buffer 460 for each user equipment, and transmits the data to the user equipment in the order of storing the data.

Figure 5:
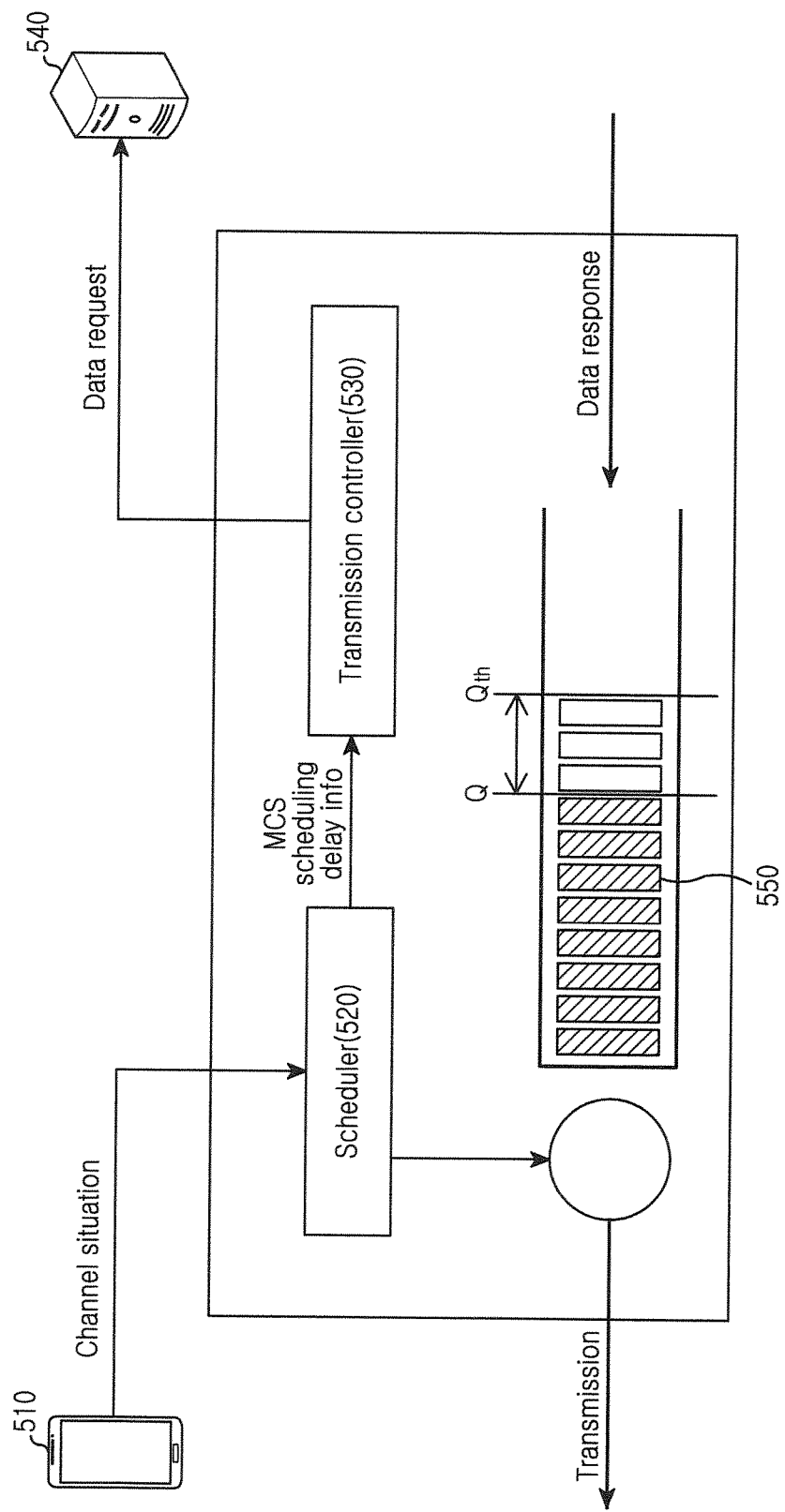
FIG. 5 illustrates an example of determining a buffer threshold for each user equipment by a base station in a wireless communication system according to an embodiment of the present invention.

FIG. 5 illustrates an example of determining a buffer threshold for each user equipment by a base station in a wireless communication system according to an embodiment of the present invention.

The base station receives state information on a channel from a user equipment 510, and a scheduler 520 determines resources to be allocated for each user equipment according to the received situation of the channel. Particularly, in the present invention, the scheduler 520 reports, to a transmission controller 530, a channel state of the user equipment 510 and delay information caused by scheduling. The transmission controller 530 determines a threshold of a buffer for each user equipment on the basis of the channel state of the user equipment 510 and the delay information caused by the scheduling which have been received from the scheduler 520. The transmission controller 530 compares a waiting amount Q of data waiting in a current buffer with the determined threshold Qth of the buffer for each user equipment. When the waiting amount Q of the current buffer is less than the threshold Qth, the transmission controller 530 increases the size of data for which the transmission controller 530 is to send a request to the server 540. When the waiting amount Q of the current buffer is greater than the threshold Qth, the transmission controller 530 reduces the size of data for which the transmission controller 530 is to send a request to the server 540.

The buffer threshold Qth for each user equipment 510 determined by the transmission controller 530 becomes a criterion of trade-off between a throughput and a transmission delay (or latency) of a service for the relevant user equipment. As the threshold increases, a throughput provided to the user equipment becomes higher, but a network delay increases. In contrast, as the threshold is reduced, the throughput provided to the user equipment becomes lower, but a network delay of the user equipment is reduced. Accordingly, there is a need for a process for adjusting the throughput and the transmission delay and thereby setting an optimal threshold so that the user equipment 510 may experience as high throughput as possible and as low network delay as possible.

In the present invention, in order to set the threshold, information may be received from the user equipment 510, information may be received from the server 540, or internal information of the base station may be used.

Figure 6:
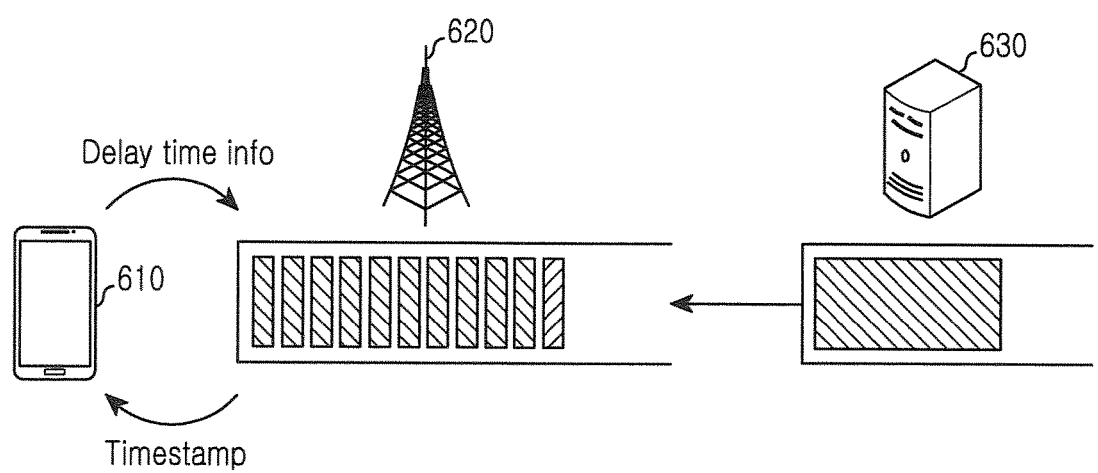
FIG. 6 illustrates an example of determining a buffer threshold for each user equipment by a user equipment in a wireless communication system according to an embodiment of the present invention.

FIG. 6 illustrates an example of determining a buffer threshold by a user equipment in a wireless communication system according to an embodiment of the present invention.

Referring to FIG. 6, a base station 620 may receive information on a delay time period from the user equipment 610, and may then determine a threshold by using the received information on the delay time period.

In order to cause the user equipment 610 to provide the information on the delay time period, the base station 620 records a time point, at which data is stored in a buffer for each user equipment, in a header of a packet as a timestamp, and transmits data to the user equipment 610. The timestamp represents a particular time point and a delay time period may be detected by comparing the timestamp with a time point at which the user equipment 610 has received the packet. The user equipment 610 receives the data from the base station 620, decodes the timestamp of the relevant data, and thereby calculates a time period delayed by the base station 620. A process for calculating the delayed time period is expressed by Equation 1 below.

$$\text{Delay} = TRX - TSTX$$

$$\text{SMA: Avg. Delay} = (D[t] + \ldots + D[t-(w-1)])/w$$

EMA: Avg. Delay=γ×Prev. Avg. Delay+(1−γ)×New
Packet's Delay                                        Equation 1

In Equation 1, Delay represents a delayed time period, TRX represents a time point of receiving a timestamp, and TSTX represents a time point of transmitting the timestamp. That is, the delayed time period signifies a difference between a time point at which the base station 620 has transmitted a timestamp and a time point at which the user equipment 610 receives the time stamp from the base station 620. Avg. Delay represents an average delay time period, SMA stands for a simple moving average, and EMA stands for an exponential moving average and may be calculated from Avg. Delay and SMA. Also, D[t] represents a delayed time period for each time point, w represents the number of times of measurement, γ represents a weight, Prev. Avg. Delay represents a previous average value, and New Packet's Delay represents a new measurement value.

After the above-described calculation process, when the average delay time period exceeds a particular threshold, the user equipment 610 transmits, to the base station 620, a signal for reducing a threshold of a buffer. When the average delay time period is less than the particular threshold, the user equipment 610 transmits, to the base station 620, a signal for increasing the threshold of the buffer.

Figure 7:
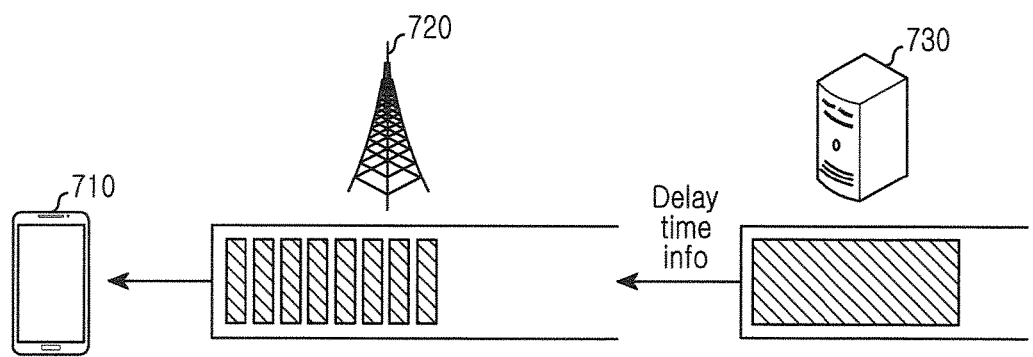
FIG. 7 illustrates an example of determining a buffer threshold for each user equipment by a server in a wireless communication system according to an embodiment of the present invention.

FIG. 7 illustrates an example of determining a buffer threshold by a server in a wireless communication system according to an embodiment of the present invention.

A base station 720 may receive, from the server 730, information on a delay time period for each user equipment 710, and may determine a threshold.

In order to provide a signal to the base station 720, the server 730 manages a buffer waiting delay time period. The server 730 stores a time period during which data stays in a buffer for each user equipment 710, and calculates an average buffer waiting delay time period. That is, the server 730 measures a buffer waiting delay time period for each user equipment, and compares an average delay time period with a required delay amount provided by the server 730. When the average delay time period is longer than the required delay amount, the server 730 requests the base station 720 to increase the threshold. When the average delay time period is shorter than the required delay amount, the server 730 requests the base station 720 to reduce the threshold.

A process for calculating the average buffer waiting delay time period is expressed as follows.

SMA: Avg. QueingDelay=(QueingDelay[t]+ . . .
QueingDelay(t−(w−1)/)/w

EMA: Avg. QueingDelay=γ×Prev. Avg. QueingDelay+(1−γ)×New Packet's QueingDelay     Equation 2

In Equation 2, QueueingDelay represents a delay time period, and QueueingDelay[t] represents a delay time period for each time point. SMA stands for a simple moving average, EMA stands for an exponential moving average, and Avg. QueueingDelay represents an average delay time period. Avg. QueueingDelay is calculated by using SMA or EMA. Also, QueueingDelay[t] represents a delayed time period for each time point, w represents the number of times of measurement, γ represents a weight, Prev. Avg. QueueingDelay represents a previous average value, and New Packet's QueueingDelay represents a new measurement value.

After calculating the average queueing delay, the server 730 compares the calculated average queueing delay with a delay requirement of a service that the server 730 itself provides for each user equipment 710. A process for calculating an average delay requirement of a service is expressed by Equation 3 below.

Avg. QueingDelay>δ×DelayRequirement(0<δ≤1)     Equation 3

When the average buffer waiting delay time period is longer than the delay requirement of the provided service, this case signifies that data cannot leave the server 730 for a long time period, and thus, the server 730 requests the base station 720 to increase a threshold of the buffer. When the average queueing delay is shorter than the delay requirement of the provided service, the server 730 requests the base station 720 to reduce the threshold of the buffer.

Figure 8:
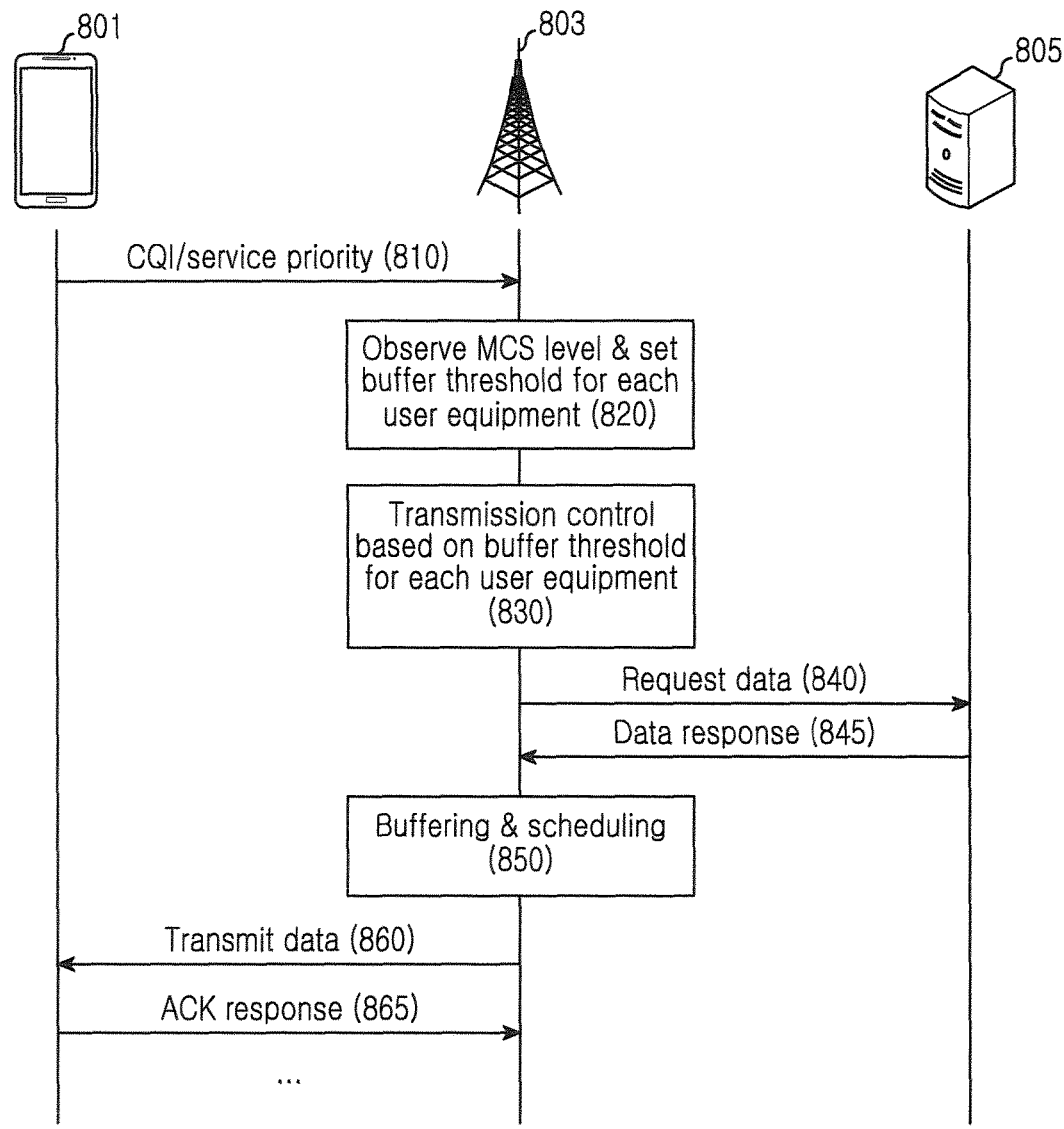
FIG. 8 illustrates an example of a process for setting a buffer threshold for each user equipment by using an MCS level and controlling transmission in a wireless communication system according to an embodiment of the present invention.

FIG. 8 illustrates an example of a process for setting a buffer threshold for each user equipment by using an MCS level and controlling transmission in a wireless communication system according to an embodiment of the present invention.

According to an embodiment of the present invention, in order to determine a buffer threshold in the wireless communication system, the base station may autonomously determine the buffer threshold by using internal information of the base station.

Referring to FIG. 8, the base station may determine the buffer threshold for each user equipment by using an MCS level among the pieces of internal information of the base station. Alternatively, the base station may determine the buffer threshold for each user equipment in view of a delay time period depending on scheduling for each user among the pieces of internal information of the base station.

In step 810, the base station 803 receives, from the user equipment 801, information on a Channel Quality Indicator (CQI) and a service priority. In step 820, the base station 803 that has received the information on the CQI and the service priority, detects a channel state of the relevant user equipment by using the received information, and then determines a Modulation and Coding Scheme (MCS). The base station 803 may determine the buffer threshold according to an MCS level of a Physical (PHY) layer and a Medium Access Control (MAC) Layer. The base station 803 may determine the channel state by using the CQI, may adjust a modulation order and a coding rate according to the channel state between the base station 803 and the user equipment 801, and thereby may determine an MCS. Accordingly, the base station 803 may adjust a transmission rate (i.e., a data rate) of data. Since the throughput becomes higher as the base station 803 determines a higher MCS value, the threshold of the buffer becomes larger.

An embodiment of determining the buffer threshold according to the MCS level is described in Table 1 below.

TABLE 1

For each UE associating with a BS
- 1. INTERVAL indexed by k <- predefined value   //e.g. 100 ms
- 2. Qmin and Qmax <- predefined value as minimum and maximum queue length
- 3. INPUT : Qth(k−1) <- queue threshold for previous INTERVAL k−1
- 4. INPUT : MCS(k) and MCS(k−1) <- moving averaged MCS level during INTERVAL k and k−1
- 5. every INTERVAL, Qth should be updated
- 6. If MCS(k) > MCS(k−1)
- 7. Qth(k) <- MIN(Qth(k−1) + MCS(k) − MCS(k−1), Qmax)
- 8. Else
- 9. Qth(k) <- MAX(Qth(k−1) + MCS(k) − MCS(k−1), Qmin)
- 10. OUTPUT : Qth(k)
- 11. End The base station updates the threshold Qth of the buffer for each user equipment during each INTERVAL cycle, and reflects, in the calculation of the threshold, a difference between the value of an MCS level (MCS(k−1)) corresponding to a preceding INTERVAL time period and the value of an MCS level (MCS(k)) corresponding to a recent INTERVAL time period. Here, the MCS level uses a value which is converted into the amount of data capable of being processed during an INTERVAL time period.

The base station 803 determines the buffer threshold for each user equipment by using the determined MCS. The base station 803 increases the buffer threshold for each user equipment as the MCS level provides a higher data rate. At this time, the base station 803 may determine the buffer threshold by considering a scheduling delay for the user equipment together.

In step 830, the base station 803 controls a data rate on the basis of the buffer threshold for each user equipment. The base station 803 compares the amount of data, which is currently waiting in the buffer, with the threshold on the basis of the determined buffer threshold for each user equipment. Then, when the amount of data currently waiting is greater than the threshold, the base station 803 determines that the amount of data to be received is reduced. When the amount of data currently waiting is less than the threshold, the base station 803 determines that the amount of data to be received is increased.

In step 840, the base station 803 sends a request for data, which is to be received by the base station 803, to the server 805. Through comparing the amount of data currently waiting with the buffer threshold for each user equipment in step 830, the base station 803 reduces the amount of data, for which the base station 803 is to send a request to the server 805, when the amount of data currently waiting is greater than the threshold. When the amount of data currently waiting is less than the threshold, the base station 803 increases the amount of data for which the base station 803 is to send a request to the server 805. In step 845, the server 805 transmits data to the base station 803 according to the amount of the data which has been requested by the base station 803, and thereby responds to the request.

In step 850, in order to transmit the data, which has been received from the server 805, to the user equipment 801, the base station 803 stores the data in a buffer area, and allocates a channel to the user equipment, to which the data is to be transmitted, through scheduling. Thereafter, in step 860, the base station 803 transmits the data to the user equipment 801. In step 865, when the base station 803 succeeds on transmitting the data to the user equipment, the base station 803 receives an ACKnowledgement (ACK), which is a response success signal, from the user equipment 801. At this time, the base station 803 may request the server 805 to retransmit data, of which the base station 803 fails to receive an ACK, in such a manner as to prioritize the retransmission of the relevant data over that of new data.

When the base station 803 receives changed CQI information from the user equipment 801, the base station 803 newly determines the MCS level according to the changed CQI information, and updates the buffer threshold for each user equipment, according to the newly-determined MCS level. Thereafter, the base station 803 performs transmission control, which is based on the buffer threshold for each user equipment in step 830, according to the updated the buffer threshold for each user equipment.

According to an embodiment of the present invention, the base station may determine a buffer threshold according to the observation of a state of a buffer for each user equipment. The base station observes a sojourn time period during which data stays in a queue for each user equipment, and reduces the buffer threshold as an average time period during which the data stays becomes longer. An embodiment depending on the observation of the state of the buffer for each user equipment is described in Table 2 below.

TABLE 2

For each UE associating with a BS
- 1. Qth βdefault value   //e.g. maximum queue length (Qmax)
- 2. If a new packet is enqueued into per-UE queue
- 3.   RC records the current time //RC: rate controller
- 4. If the packet is dequeued from per-UE queue
- 5.   Tso <- RC computes the packet's sojourn time
- 6. Avg. Tso <- (Tso[t]+...+Tso[t−(w−1)])/w   //w: time window for averaging
- 7.   If Avg. Tso > SOJOURN_TIME_THRESHOLD   //e.g. SOJOURN_TIME_THRESHOLD = 10 ms
- 8.   Qth <- MAX(Qth − Δ, Qmin) //e.g. Qmin=0
- 9. Else
- 10.   Qth <- MIN(Qth + Δ, Qmax)
- 11. Go to 2

According to Table 2, the base sation manages an average time period during which data stays in the buffer for each user equipment, reduces the threshold when the value of an average time period during which a packet stays in the buffer for each user equipment is greater than SOJOURN_TIME_THRESHOLD, and increases the threshold when the value of the average time period during which the packet stays in the buffer for each user equipment is less than SOJOURN_TIME_THRESHOLD.

Figure 9:
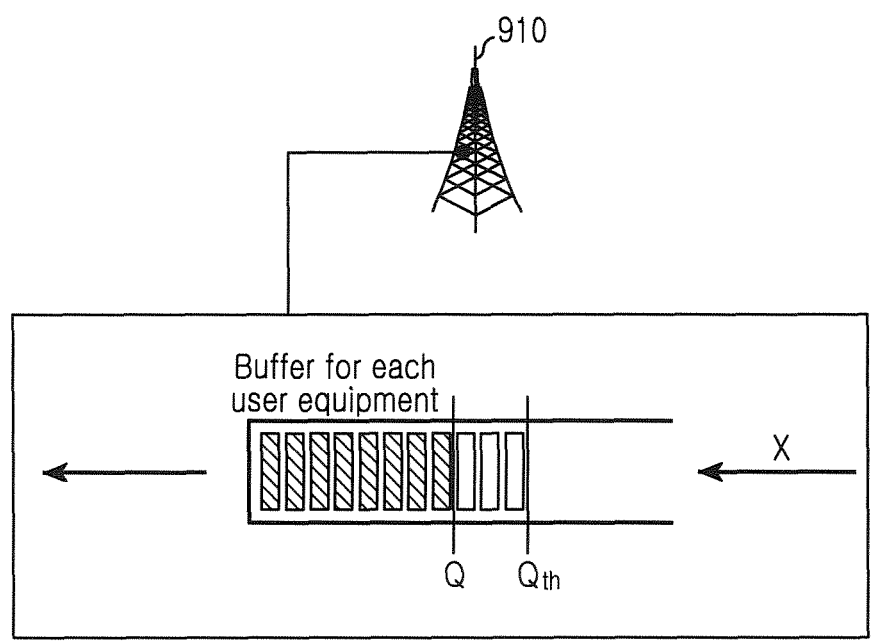
FIG. 9 illustrates an example of transmission control which is based on a buffer threshold for each user equipment in a wireless communication system according to an embodiment of the present invention.

FIG. 9 illustrates an example of transmission control which is based on a buffer threshold in a wireless communication system according to an embodiment of the present invention.

A base station 910 performs a transmission control operation for determining the amount of data for which the base station 910 is to send a request to a server. The transmission control is performed on the basis of the comparison of a waiting amount of data waiting in a current buffer with a buffer threshold for each user equipment.

The base station 910 compares a current buffer waiting amount Q with the buffer threshold Qth. Thereafter, when the current buffer waiting amount is less than the buffer threshold, the base station 910 makes a request for increasing an overall requested size X. When the current buffer waiting amount is greater than the buffer threshold Qth, the base station 910 makes a request for reducing the overall requested size X.

Specifically, in order to determine the request size, the size of data, which is requested when the current buffer waiting amount is less than the buffer threshold, is expressed by Equation 4 below.

$$X(t+1)=X(t)+\alpha \qquad \text{Equation 4}$$

Here, α represents an optional coefficient, and signifies the increased size of requested data, namely, an additive increase. According to Equation 4, when the current buffer waiting amount is less than the buffer threshold, the size of data for which an immediate next request is made is increased. At this time, α may be set regardless of a difference between the buffer threshold and the current buffer waiting amount. Also, X(0) which is an initial value may be set to be in proportion to a wireless channel state (or a data rate) between the user equipment and the base station.

The size of data, which is requested when the current buffer waiting amount is less than the buffer threshold, is expressed by Equation 5 below.

$$X(t+1)=X(t)\times(1-\beta) \qquad \text{Equation 5}$$

Here, β represents an optional coefficient less than 1, and signifies the reduced size of requested data, namely, a multiplicative decrease. According to Equation 5, when the current buffer waiting amount is greater than the buffer threshold, the size of data for which an immediate next request is made is reduced.

When the size of the data to be requested has been determined, the base station 910 may determine the size of data, for which the base station 910 sends a request to each server, in order to perform fair distribution for each service. A method for assigning a size for which the base station 910 sends a request to each server is expressed by Equation 6 below.

Per-service weight $W_s$                           Equation 6
$$W = \sum_{s \in UE} W_s$$

Per-service round-trip time $RTT_s$
$$RTT_{min} = \min_{s \in UE} RTT_s$$

Per-service requested data size
$$X_s = X \times \frac{W_s}{W} \times \frac{RTT_s}{RTT_{min}}$$

Here, Ws represents a weight for each service, W represents the sum of the weights for the services, RTTs represents a round-trip time for each service, RTTmin represents a minimum value among the round-trip times for the services, Xs represents the size of requested data for each service, and X represents the size of overall requested data. Referring to Equation 6, when the size of the overall requested data is distributed in proportion to the weight and round-trip time for each service, the size of the requested data for each service may be calculated. In a case where transmission is controlled in such a manner as to adjust the size of the requested data for each service, when one user equipment receives data from multiple servers, the one user equipment may receive the data so as to be in proportion to the weight for each service. When priorities among services are all identical, an identical data rate may be guaranteed among services all having an identical priority. The reason for considering the round-trip time for each service is because a data response to a request arrives in proportion to the round-trip time when the base station sends the request for data to the server.

Figure 10:
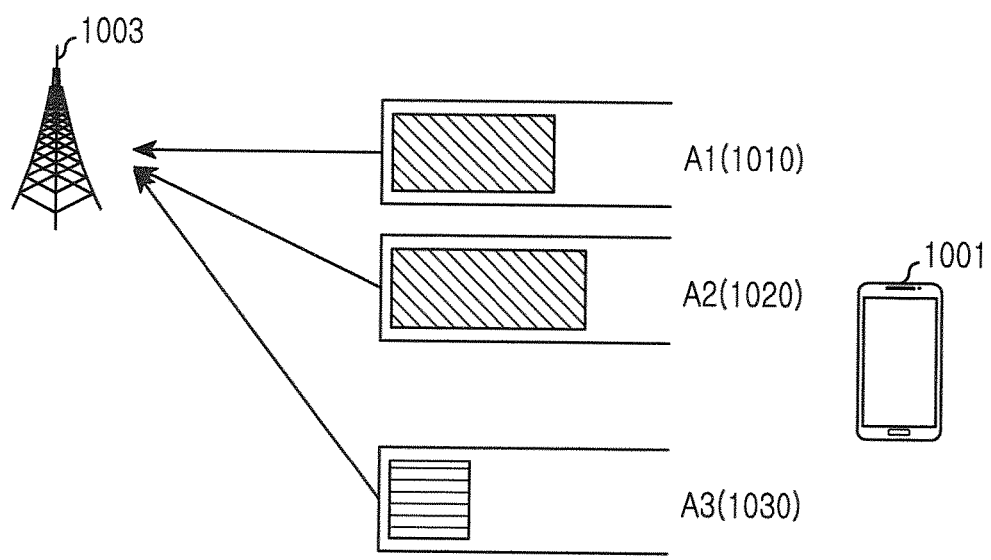
FIG. 10 illustrates an example of providing service priority information by a user equipment according to an embodiment of the present invention.

FIG. 10 illustrates an example of providing service priority information by a user equipment according to an embodiment of the present invention.

According to an embodiment of the present invention, the user equipment 1001 may provide a base station 1003 with priority information for each service.

The priority may be determined to reflect the preference of a user. The user may directly assign a priority to one or more services. For example, when the existence of services expressed as A1(1010), A2(1020), and A3(1030) is considered, the user equipment may set A1 to a high priority, may set A2 to a normal priority, and may set A3 to a low priority.

FIG. 10 illustrates an example of providing priority information for each service in a wireless communication system according to an embodiment of the present invention. That is, the user equipment may be provided with multiple services, and may determine priorities among the multiple services. For example, the user equipment may determine a priority according to the priority of the user for each service, the form of use of a service, and the type of a service.

Also, the user equipment may internally assign the priority according to a form or condition of use of a service. The user equipment may identify the number of times of execution of a particular application and a streaming application, and may assign a high priority to an application having a large screen, or may assign a low priority to an application having a small screen. Alternatively, the user equipment may assign a high priority to a streaming application between applications having different types, or may assign a low priority to a download application. Also, the user equipment may set a priority in such a manner as to assign a high priority to a foreground application and to assign a low priority to a background application.

The user equipment may transmit information on the determined priority together with a Channel Quality Report (CQI). Also, the user equipment may transmit a priority of a service together with a connection establishment procedure for a service from the base station in a state of including the priority in the connection establishment procedure.

The base station may receive information on a service from the user equipment, and may send a request for data to a server that provides the service, according to the received information on the service. The base station may acquire service subscription information from the server and may distinguish the provided service from another service.

Figure 11:
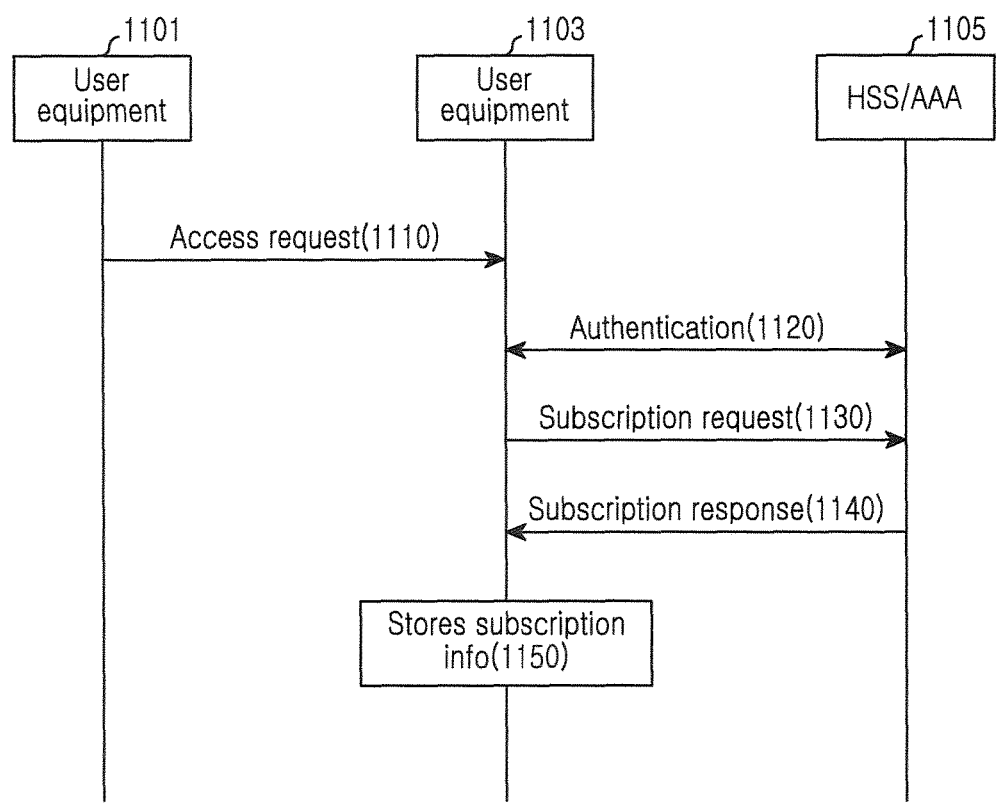
FIG. 11 illustrates an example of a process for acquiring service subscription information by a base station according to an embodiment of the present invention.

FIG. 11 illustrates an example of a process for acquiring service subscription information by a base station according to an embodiment of the present invention.

Referring to FIG. 11, when a user equipment initially accesses the base station, the base station acquires low latency base station service subscription information from a Home Subscriber Server (HSS)/Authentication Authorization and Accounting (AAA).

In step 1110, the user equipment 1101 transmits access request information to the base station 1103. At this time, the access request information includes capability information and user equipment IDentification (ID) information.

In step 1120, when the base station 1103 receives an access request from the user equipment 1101, sends a request for authentication to the HSS/AAA 1105, and receives a response to the authentication from the HSS/AAA 1105.

In step 1130, the base station 1103 transmits subscription request information to the HSS/AAA 1105. The subscription request information includes the ID information of the user equipment. In step 1140, the HSS/AAA 1105 receives the subscription request information from the base station 1103, and then transmits subscription response information to the base station 1103 in response to the subscription request information. The subscription response information includes subscription information of the user equipment 1101. The subscription information may include Quality of Service (QoS) information to which the user equipment 1101 subscribes, respective names of services, the name of a category which refers to multiple services, and the like.

In step 1150, the base station 1103 receives the subscription response information from the HSS/AAA 1105, and then stores subscription information of the user equipment 1101.

Figure 13:
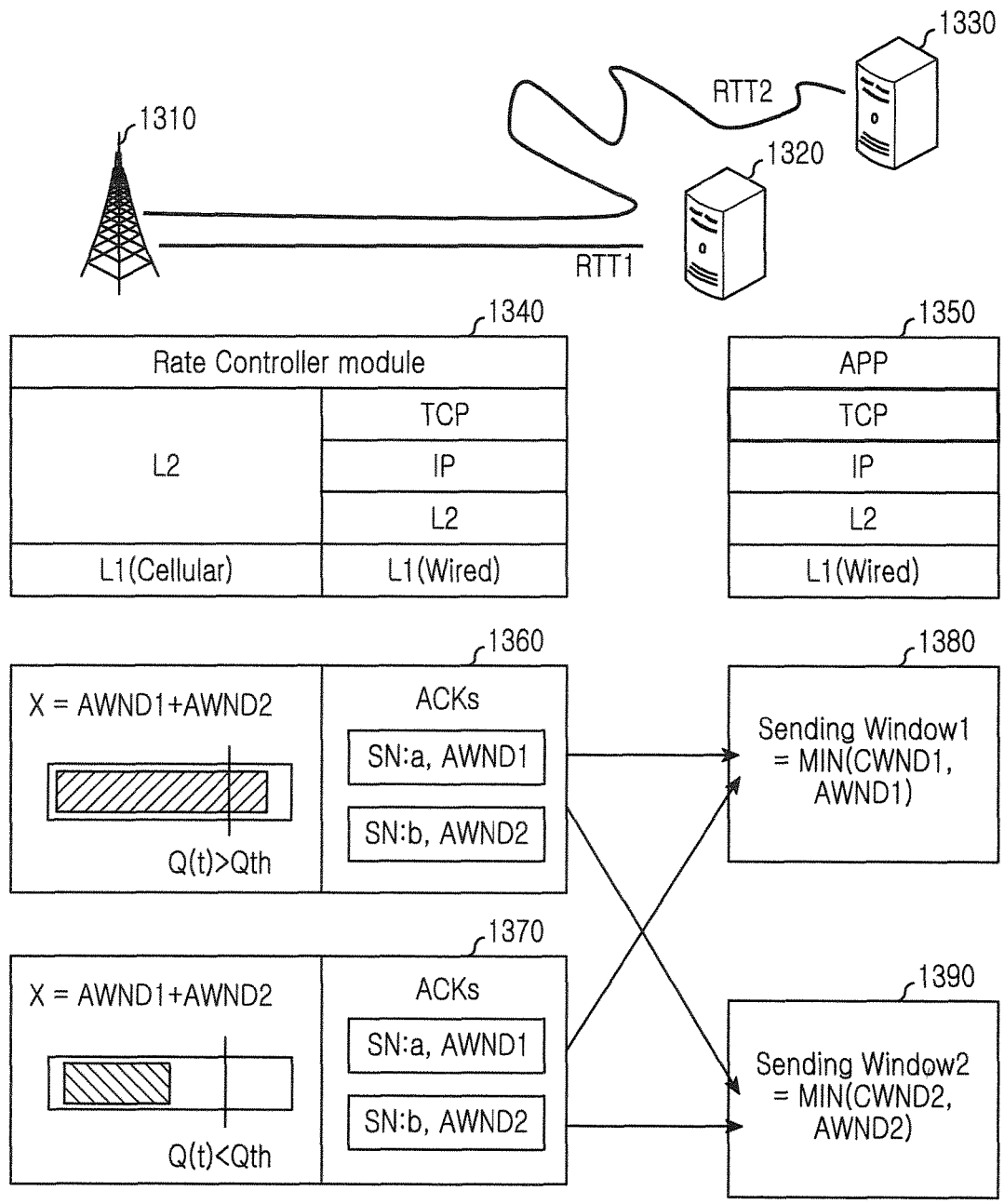
FIG. 13 illustrates an example of configuring a reception window of a TCP flow by a base station according to an embodiment of the present invention.
Figure 14:
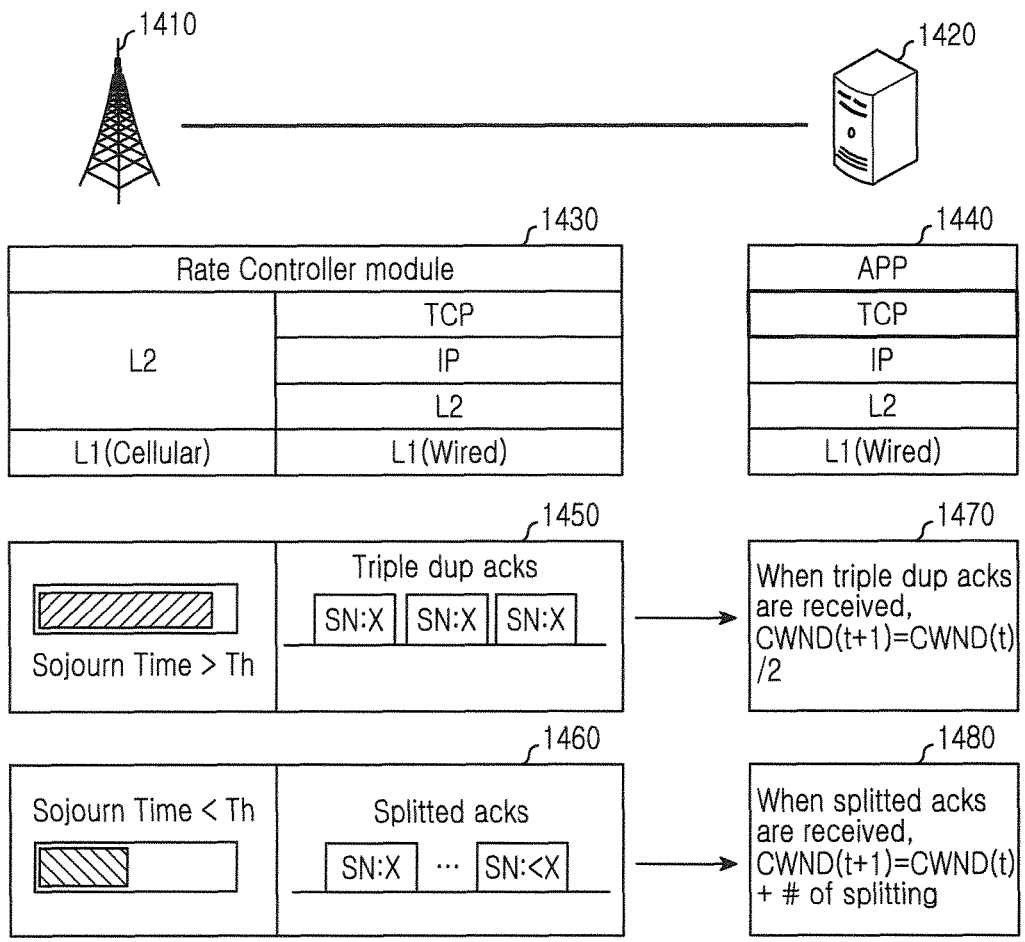
FIG. 14 illustrates an example of controlling a throughput of a server by a base station according to an embodiment of the present invention.

Although the above-described embodiment of the present invention corresponds to a case which does not consider TCP/IP transmission control, an embodiment of the present invention may be applied to even a server that performs the TCP/IP transmission control. An example of transmission control for the server that performs the TCP/IP transmission control is as illustrated in FIGS. 12, 13, and 14 below.

Figure 12:
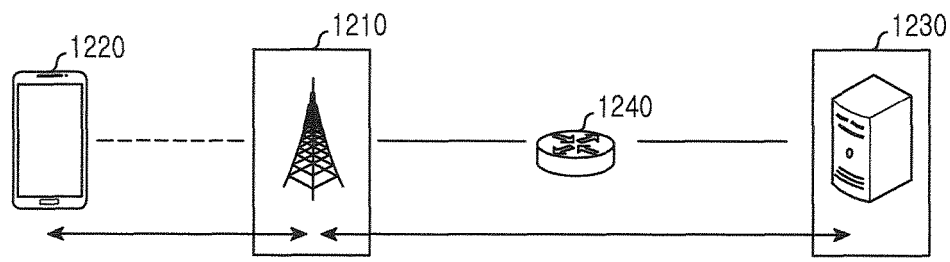
FIG. 12 illustrates an example of a system model which causes a cellular network to operate in conjunction with a TCP/IP protocol in a wireless communication system according to an embodiment of the present invention.

FIG. 12 illustrates an example of a system model which causes a cellular network to operate in conjunction with a TCP/IP protocol in a wireless communication system according to an embodiment of the present invention. That is, consideration is given to a case where a user equipment illustrated in FIG. 12 makes a connection to a server, that provides a service, without using the TCP/IP protocol. At this time, the user equipment may provide a cellular base station with a service ID and ID information of the user equipment itself, and the cellular base station may detect an IP address of the server, that is located in the Internet, by using the service ID. Then, the cellular base station, in place of the user equipment, may establish a TCP/IP connection to the server located in the Internet, and may deliver a service, which has been requested by the user equipment, to the user equipment by using the ID of the user equipment.

Referring to FIG. 12, the server 1230 and the base station 1210 are illustrated as being connected to each other through a gateway 1240 according to a TCP/IP. The gateway 1240 may be referred to as a "System Architecture Evolution (SAE) gateway." When a communication connection protocol between the base station 1210 and the user equipment 1220 differs from a communication connection protocol between the base station 1210 and the server 1230 as illustrated in FIG. 12, namely, when a connection between the base station 1210 and the server 1230 complies with the TCP/IP protocol, and a connection between the base station 1210 and the user equipment 1220 does not comply with the TCP/IP protocol, it is necessary to cause the base station 1210 and the server 1230, that are transmission control elements, to operate in conjunction with each other. In the present invention, in order to cause the transmission control elements to operate in conjunction with each other, the base station 1210 operates as a TCP flow. When the base station 1210 operates as a reception terminal, two options are possible. Firstly, there is a method in which the base station 1210 applies a data request size, which is based on transmission control, to a TCP connection. In the case of a TCP connection, when the server transmits data, the base station transmits an ACK to the server in response to the transmitted data. The data request size may be inserted into a window size (16 bits) field of the ACK. Table 3 below represents a format of a TCP header.

TABLE 3

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Source Port          |       Destination Port        |
+-+-+-+-+-+-+-+-+-+-+-+-+-+-+-+-+-+-+-+-+-+-+-+-+-+-+-+-+-+-+-+-+
|                        Sequence Number                        |
+-+-+-+-+-+-+-+-+-+-+-+-+-+-+-+-+-+-+-+-+-+-+-+-+-+-+-+-+-+-+-+-+
|                     Acknowledgement Number                    |
+-+-+-+-+-+-+-+-+-+-+-+-+-+-+-+-+-+-+-+-+-+-+-+-+-+-+-+-+-+-+-+-+
| Data  |           |U|A|P|R|S|F|                               |
| Offset| Reserved  |R|C|S|S|Y|I|            Window             |
|       |           |G|K|H|T|N|N|                               |
+-+-+-+-+-+-+-+-+-+-+-+-+-+-+-+-+-+-+-+-+-+-+-+-+-+-+-+-+-+-+-+-+
|           Checksum            |         Urgent Pointer        |
+-+-+-+-+-+-+-+-+-+-+-+-+-+-+-+-+-+-+-+-+-+-+-+-+-+-+-+-+-+-+-+-+
|                    Options                    |    Padding    |
+-+-+-+-+-+-+-+-+-+-+-+-+-+-+-+-+-+-+-+-+-+-+-+-+-+-+-+-+-+-+-+-+
|                             data                              |
+-+-+-+-+-+-+-+-+-+-+-+-+-+-+-+-+-+-+-+-+-+-+-+-+-+-+-+-+-+-+-+-+
```

Secondly, there is a method in which the base station checks a sojourn time period of a buffer for each user equipment and adjusts a TCP ACK. This method corresponds to a case which uses a TCP transmission control method of the server without using a transmission control method of the base station.

FIG. 13 illustrates an example of configuring a reception window of a TCP flow by a base station according to an embodiment of the present invention.

Referring to FIG. 13, as indicated by reference numerals 1340 and 1350, when a connection between a user equipment and the base station 1310 is not a TCP protocol connection but a connection between the base station 1310 and servers 1320 and 1330 is made by using the TCP/IP protocol, the base station 1310 may control, through transmission control, a throughput between different protocol connections between the user equipment and the base station 1310, and the base station 1310 and the servers 1320 and 1330.

The base station 1310 may perform not only communication between different protocol connections but also transmission control therebetween. In order to limit throughputs of the servers 1320 and 1330, the base station 1310 may configure a reception window of a TCP flow. The base station 1310 determines a data request size according to the above-described transmission control which is based on a buffer threshold for each user equipment.

After the base station distributes the data request size for each TCP flow on the basis of the determined data request size and sets the distributed values in reception window fields of respective TCP ACKs, the base station retransmits a TCP ACK to a server that is a transmission terminal of a TCP flow, and then limits a throughput of the server.

In order to distribute the data request size for each TCP flow, the base station 1310 may prioritize throughput fairness between flows or may prioritize weight fairness. In order to distribute the data request size for each TCP flow, the base station 1310 transmits an ACK to the servers 1320 and 1330, and measures a time period until the base station 1310 receives data corresponding to a Sequence Number (SN) included in the ACK. Here, the measured time period is referred to as an "RTT for each TCP flow."

When the base station 1310 distributes the TCP flow in such a manner as to prioritize the throughput fairness between flows, the base station 1310 may distribute the TCP flow by using a magnitude proportional to an RTT. When consideration is given to a case where two TCP flows exist, a process for distributing the TCP flow by using the magnitude proportional to the RTT is expressed by Equation 7 below.

$$AWND1/RTT1 = AWND2/RTT2$$

$$X = AWND1 + AWND2 \qquad \text{Equation 7}$$

Here, AWND which stands for an advertised window represents a window for controlling a flow, and X represents a data request size. The base station 1310 distributes the data request size for each TCP flow, sets the distributed values in reception window fields of respective TCP ACKs, and then transmits the TCP ACK to a server that is a transmission terminal (i.e., a sender) of the TCP flow.

When the base station 1310 distributes the TCP flow in such a manner as to prioritize the weight fairness between flows, the base station 1310 distributes the TCP flow in proportion to an RTT and weights among flows in view of not only the RTT but also the weights among the flows. When consideration is given to a case where two TCP flows exist, a process for distributing the TCP flow in such a manner as to prioritize the weight fairness is expressed by Equation 8 below.

$$AWND1*W1/RTT1 = AWND2*W2/RTT2$$

$$X = AWND1 + AWND2 \qquad \text{Equation 8}$$

Here, W represents a weight of the TCP flow. The base station 1310 distributes a data request size for each TCP flow in view of the weight, sets the distributed values in reception window fields of respective TCP ACKs, and then transmits the TCP ACK to a server that is a sender of the TCP flow.

The servers 1320 and 1330 may receive ACKs, and may then determine a sending window by using a smaller value among a Congestion Window (CWND) managed by the servers 1320 and 1330 and an Advertised Window (AWND) received from the base station 1310.

In FIG. 13, reference numerals 1360 and 1370 indicate an example of a process for distributing data to be requested to the servers. The base station 1310 may determine sending windows of the respective servers by adjusting the value of the AWND according to the above-described throughput fairness between flows or weight fairness therebetween.

When current queueing data is larger than a buffer threshold of the user equipment (as indicated by reference numeral 1360), the base station 1310 needs to reduce the requested data. When the current queueing data is smaller than the buffer threshold of the user equipment (as indicated by reference numeral 1370), the base station 1310 performs a control operation for increasing the requested data. The base station 1310 determines the size of overall data, for which the base station 1310 is to send a request to the servers 1320 and 1330, for the above-described control, and sends requests for the determined size of the overall data to the respective servers 1320 and 1330 according to the above-described AWNDs (as indicated by reference numerals 1380 and 1390).

FIG. 14 illustrates an example of controlling a throughput of a server according to an embodiment of the present invention.

Referring to FIG. 14, a base station 1410 may adjust an ACK according to a time period during which data stays in a buffer for each user equipment, and thereby may limit a throughput of the server 1420. The server 1420 receives an ACK from the base station 1410 and adjusts a CWND. When a network is congested, the base station 1410 controls transmission by adjusting the size of the CWND so as to be small and slowly transmitting data. When the network is not congested, the base station 1410 controls transmission by adjusting the size of the CWND so as to be large and rapidly transmitting data.

In order to adjust the ACK, the base station 1410 compares a sojourn time period of data for each user equipment with a threshold of a sojourn time period during which data stays in the buffer for each user equipment. After the base station 1410 compares the sojourn time period of the data for each user equipment with the threshold of the buffer sojourn time period for each user equipment, when the sojourn time period of the data for each user equipment is longer than the threshold of the buffer sojourn time period for each user equipment (as indicated by reference numeral 1450), the base station 1410 duplicates the ACK, and transmits the duplicated ACKs to the server 1420. When the sojourn time period of the data for each user equipment is shorter than the threshold of the buffer sojourn time period for each user equipment (as indicated by reference numeral 1460), the base station 1410 splits the ACK, and transmits the split ACKs to the server 1420.

When the server 1420 receives the ACK from the base station 1410, if the server 1420 receives the duplicated ACKs all having an identical SN from the base station 1410, the server 1420 reduces the size of the CWND by ½. A process 1470 for determining a CWND is expressed by Equation 9 below.

$$CWND(t+1) = CWND(t)/2 \qquad \text{Equation 9}$$

Here, CWND(t) represents a CWND at a particular time point.

When the server 1420 receives the split ACKs from the base station 1410, the server 1420 increases the size of a CWND by the split ACKs. A process 1480 for adjusting the size of the CWND by the split ACKs is expressed by Equation 10 below.

$$CWND(t+1) = CWND(t) + \# \text{ of splitting} \qquad \text{Equation 10}$$

Here, CWND(t) represents a CWND at a particular time point, and # of splitting represents the number of split ACKs. Also, an SN of the split ACKs may be set to be less than a value obtained by adding a segment size (in a unit of byte) to the value of an SN of a received TCP data packet.

Figure 15:
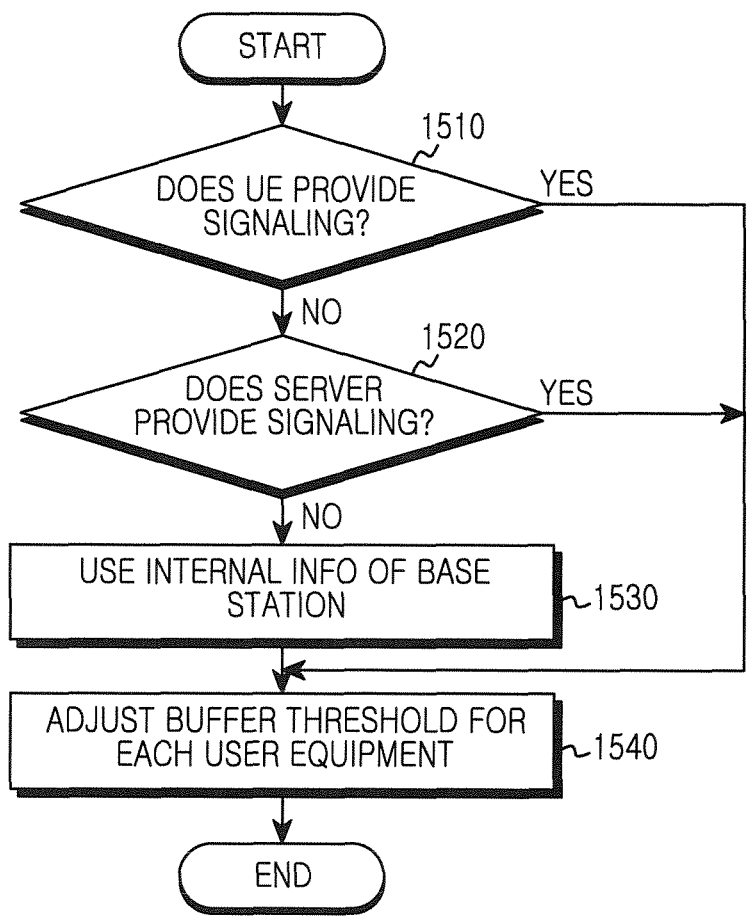
FIG. 15 illustrates an embodiment of a process for determining a buffer threshold for each user equipment in a wireless communication system according to an embodiment of the present invention.

FIG. 15 illustrates an embodiment of a process for determining a buffer threshold in a wireless communication system according to an embodiment of the present invention.

Referring to FIG. 15, in step 1510, a base station identifies the reception of a signal from a user equipment. In order to receive a signal from the user equipment for the purpose of determining a threshold, the base station records a timestamp in a header of data and transmits the data to the user equipment. When the base station receives delayed time information from the user equipment, in step 1540, the base station determines a buffer threshold for each user equipment on the basis of the signal received from the user equipment. When the base station does not receive the signal for determining the buffer threshold for each user equipment from the user equipment, in step 1520, the base station identifies the reception of a signal from a server.

In step 1520, the base station identifies the reception of a signal from the server. When the server requests the base station to increase or reduce the buffer threshold for each user equipment, the base station receives request information from the server, and determines the buffer threshold for each user equipment. When the server does not request the base station to increase or reduce the buffer threshold for each user equipment, in step 1530, the base station determines the threshold by using internal information of the base station.

In step 1530, the base station identifies the internal information thereof. The base station may identify an MCS level of PHY and MAC layers and a delay caused by radio resource scheduling, or may identify a sojourn time period during which data stays in a buffer for each user equipment which depends on the observation of a state of the buffer for each user equipment, and thereby may determine the buffer threshold of the buffer for each user equipment. Alternatively, the base station may determine the buffer threshold for each user equipment by estimating a speed at which a packet leaves the buffer for each user equipment.

In step 1540, the base station determines the buffer threshold for each user equipment. The base station may determine the buffer threshold for each user equipment by using at least one piece of information in steps 1510, 1520, and 1530. By using the at least one piece of information in steps 1510, 1520, and 1530, the base station may increase or reduce the buffer threshold for each user equipment in order to reduce a delay of transmission of data to the user equipment.

Figure 16:
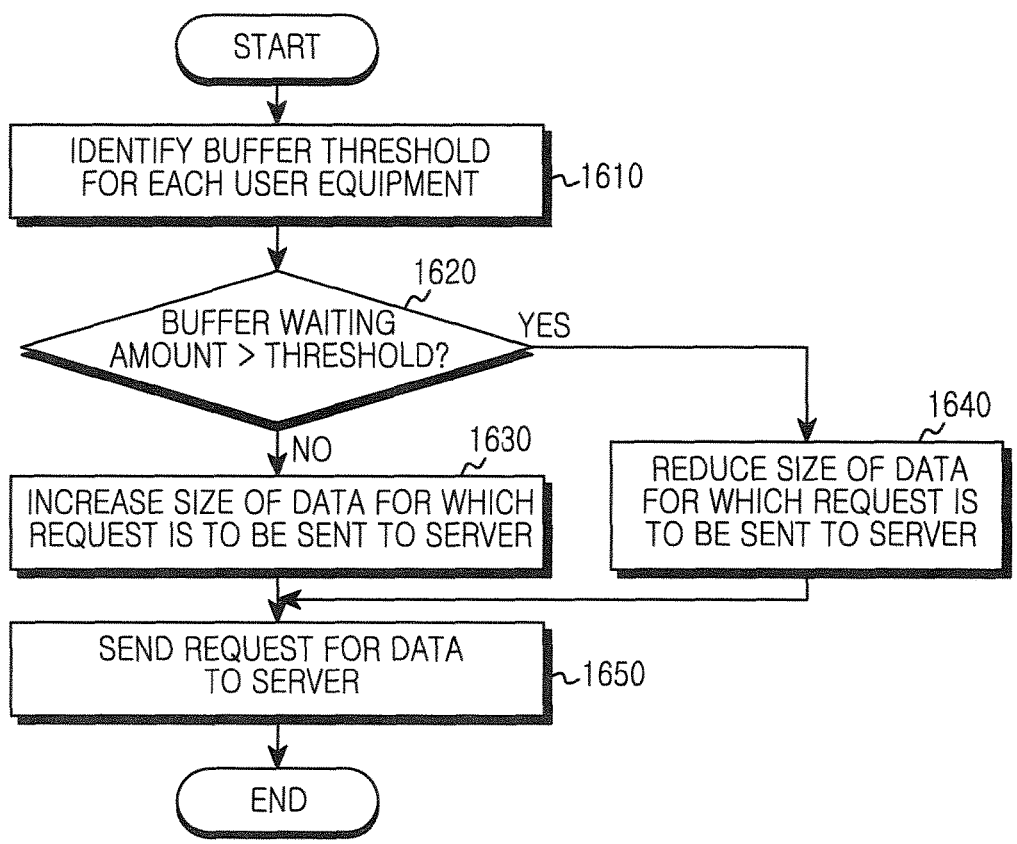
FIG. 16 illustrates an embodiment of a process for controlling transmission by using a buffer threshold for each user equipment in a wireless communication system according to an embodiment of the present invention.

FIG. 16 illustrates an embodiment of a process for controlling transmission by using a buffer threshold in a wireless communication system according to an embodiment of the present invention.

Referring to FIG. 16, in step 1610, a base station identifies a buffer threshold for each user equipment. The buffer threshold for each user equipment may be determined on the basis of delay time information received from the user equipment, internal information of the base station, or information received from a server.

In step 1620, the base station compares a state of a current buffer with the threshold. After the base station compares the length of data waiting in the current buffer with the threshold, when the length of the data waiting in the current buffer is less than the threshold, the base station proceeds to step 1630, and increases the size of transmission data for which the base station is to send a request to the server. When the length of the data waiting in the current buffer is greater than the threshold, the base station proceeds to step 1640, and reduces the size of the transmission data for which the base station is to send the request to the server. Also, in step 1650, the base station sends a request for the data to the server.

Figure 17:
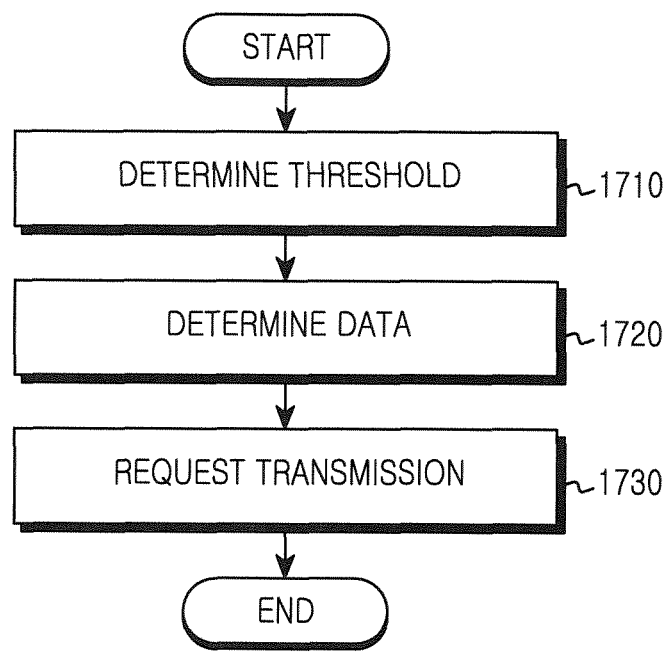
FIG. 17 illustrates an example of a procedure for controlling transmission with an intermediate node as the center in a wireless communication system according to an embodiment of the present invention.

FIG. 17 illustrates an example of a procedure for controlling transmission with an intermediate node as the center in a wireless communication system according to an embodiment of the present invention.

Referring to FIG. 17, in step 1710, a base station determines a buffer threshold for each user equipment by using a user equipment, a server, and internal information of the base station. For example, the base station may receive delayed time information from the user equipment and may determine a buffer threshold for each user equipment, may receive information on an average buffer waiting delay time period from the server and may determine the buffer threshold for each user equipment, or may determine the buffer threshold for each user equipment on the basis of internal MCS level information of the base station, scheduling delay information, or information depending on the observation of a state of a buffer for each user equipment.

In step 1720, the base station compares the buffer threshold for each user equipment, which has been determined in step 1710, with a buffer waiting amount, and then determines the size of data to be requested. After the base station compares the buffer threshold for each user equipment with the buffer waiting amount, when the buffer threshold for each user equipment is greater than the buffer waiting amount, the base station performs a control operation for increasing the size of the requested data. When the buffer threshold for each user equipment is less than the buffer waiting amount, the base station performs a control operation for reducing the size of the requested data.

In step 1730, the base station sends a request for the data to the server according to the size of the data determined in step 1720, and the server transmits the data by the size of the data that the base station has requested.

Figure 18:
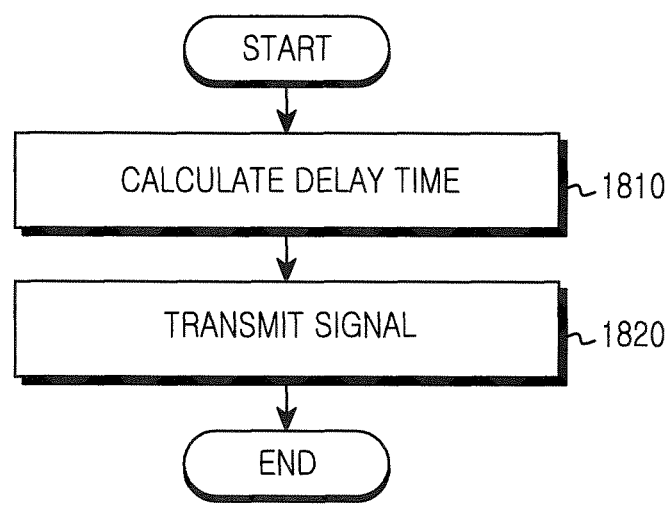
FIG. 18 illustrates an example of a procedure for transmitting a signal by a user equipment for performing transmission with an intermediate node as the center in a wireless communication system according to an embodiment of the present invention.

FIG. 18 illustrates an example of a procedure for transmitting a signal by a user equipment for performing transmission with an intermediate node as the center in a wireless communication system according to an embodiment of the present invention.

Referring to FIG. 18, in step 1810, the user equipment calculates a delayed time period. The user equipment receives, from a base station, data having a timestamp recorded therein, decodes the data, and then calculates a delayed time period. The delayed time period may be calculated by using a difference between a time period of receiving the data and a time period during which the data queues in the base station.

In step 1820, the user equipment transmits the delayed time information. After the user equipment calculates the delayed time period in step 1810, the user equipment may transmit the delayed time information, which is required for the base station to determine an increase or a reduction in a buffer threshold for each user equipment, to the base station. Alternatively, when the delayed time period is greater than a particular threshold, the user equipment may transmit, to the base station, a signal for reducing the threshold of a buffer. When the delayed time period is less than the particular threshold, the user equipment may transmit, to the base station, a signal for increasing the threshold of the buffer.

Figure 19:
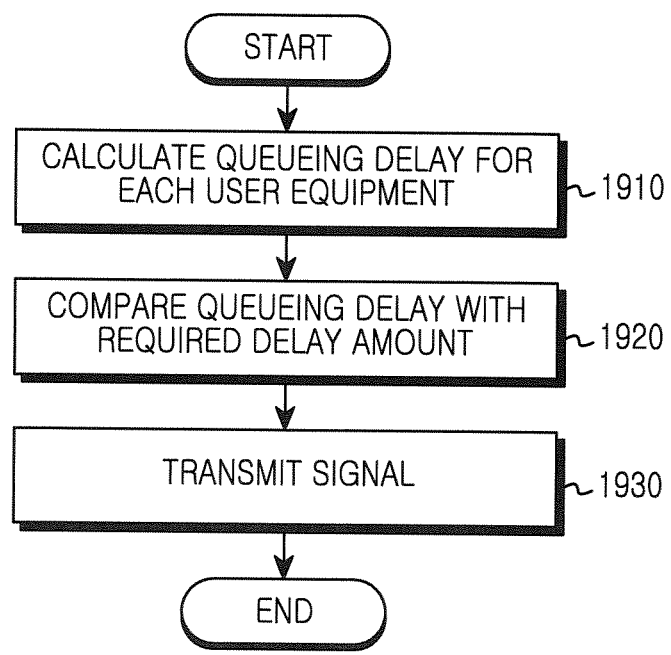
FIG. 19 illustrates an example of a procedure for transmitting a signal by a server for performing transmission with an intermediate node as the center in a wireless communication system according to an embodiment of the present invention.

FIG. 19 illustrates an example of a procedure for transmitting a signal by a server for performing transmission with an intermediate node as the center in a wireless communication system according to an embodiment of the present invention.

Referring to FIG. 19, in step 1910, the server calculates an average queueing delay time period for each user equipment. The server stores a time period, during which data stays in a queue of the server, for each user equipment, and calculates an average sojourn time period during which data stays in the queue of the server.

In step 1920, the server compares the sojourn time period, during which data stays in the queue, with a required delay amount for each service. When the sojourn time period during which the data stays in the queue is longer than the required delay amount for each service, the server determines that the sojourn time period of the data in the server is lasting for a long time period, and generates a request signal for increasing the buffer threshold for each user equipment so that the base station may receive a larger amount of data. When the sojourn time period during which the data stays in the queue is shorter than the required delay amount for each service, the server determines that the sojourn time period of the data in the server is short, and generates a request signal for reducing the buffer threshold for each user equipment.

In step 1930, the server may transmit information on the sojourn time period during which the data stays in the queue which is required for the base station to determine an increase or a reduction in the buffer threshold for each user equipment. Alternatively, the server may transmit, to the base station, the generated request signal for increasing or reducing the buffer threshold for each user equipment.

Figure 20:
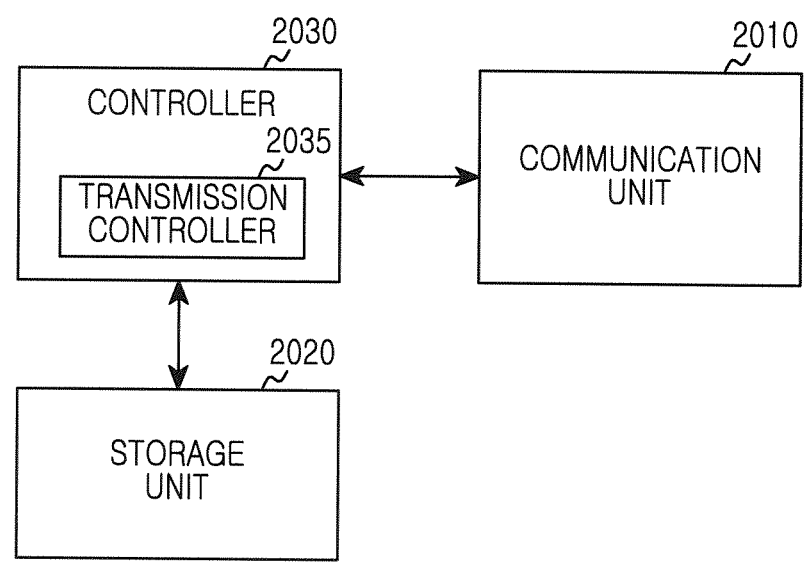
FIG. 20 illustrates a block configuration of a base station apparatus for controlling transmission with an intermediate node as the center in a wireless communication system according to an embodiment of the present invention.

FIG. 20 illustrates a block configuration of a base station apparatus for controlling transmission with an intermediate node as the center in a wireless communication system according to an embodiment of the present invention.

Referring to FIG. 20, the base station apparatus includes a communication unit 2010, a storage unit 2020, a controller 2030, and a transmission controller 2035.

The communication unit 2010 performs a function of transmitting/receiving a signal. Particularly, the communication unit 2010 may perform communication between a user equipment and the controller 2030, and communication between a server and the controller 2030, and may also perform communication between the controller 2030 and the storage unit 2020. Accordingly, the communication unit 2010 may be referred to as a transmitter, a receiver, or a transmitter/receiver.

The storage unit 2020 stores data, such as a basic program, an application program, setting information, and the like for an operation of the apparatus for controlling transmission. Particularly, the storage unit 2020 may store information related to a buffer for each user equipment. Also, the storage unit 2020 provides data stored therein according to a request of the controller 2030.

The controller 2030 controls an overall operation of the apparatus for controlling transmission. According to an embodiment of the present invention, the controller 2030 includes the transmission controller 2035. For example, the transmission controller 2035 controls the apparatus for controlling transmission to perform the procedures illustrated in FIGS. 1 to 18. An operation of the controller 2030 according to an embodiment of the present invention is described below.

The controller 2030 determines a buffer threshold for each user equipment by using information received from the user equipment and the server and information of a base station. The controller 2030 compares the determined buffer threshold for each user equipment with a buffer waiting amount. When the buffer threshold for each user equipment is greater than the buffer waiting amount, the controller 2030 performs a control operation for increasing the size of requested data. When the buffer threshold for each user equipment is less than the buffer waiting amount, the controller 2030 performs a control operation for reducing the size of the requested data.

Figure 21:
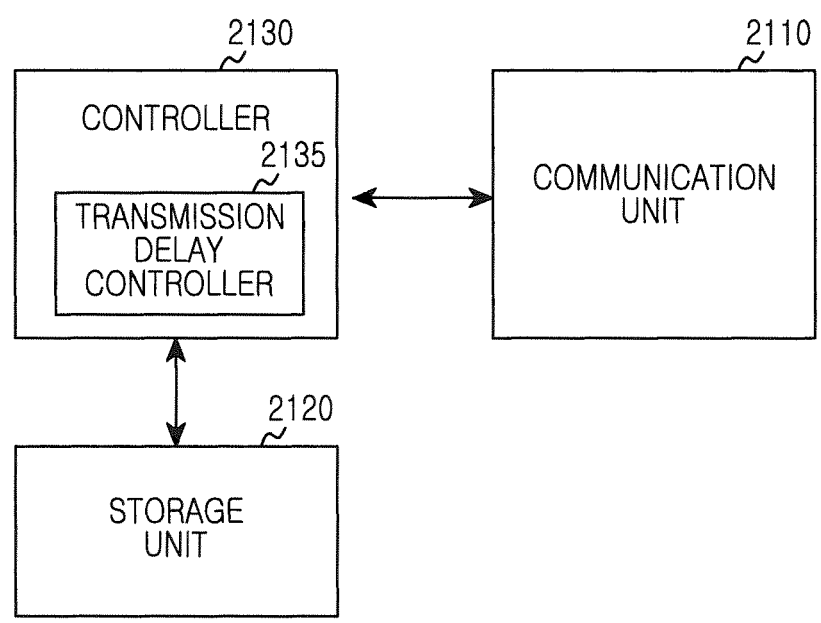
FIG. 21 illustrates a block configuration of a user equipment apparatus for controlling transmission with an intermediate node as the center in a wireless communication system according to an embodiment of the present invention.

FIG. 21 illustrates a block configuration of a user equipment apparatus for controlling transmission with an intermediate node as the center in a wireless communication system according to an embodiment of the present invention.

Referring to FIG. 21, the user equipment apparatus includes a communication unit 2110, a storage unit 2120, a controller 2130, and a transmission delay controller 2135.

The communication unit 2110 performs a function of transmitting/receiving a signal. Particularly, the communication unit 2110 may perform communication between a base station and the controller 2130, and communication between the controller 2130 and the storage unit 2120. Accordingly, the communication unit 2110 may be referred to as a transmitter, a receiver, or a transmitter/receiver.

The storage unit 2120 stores data, such as a basic program, an application program, setting information, and the like for an operation of the user equipment apparatus. Particularly, the storage unit 2120 may store information related to a delay time period. Also, the storage unit 2120 provides data stored therein according to a request of the controller 2130.

The controller 2130 controls an overall operation of the user equipment apparatus. According to an embodiment of the present invention, the controller 2130 includes the transmission delay controller 2135. For example, the transmission delay controller 2135 controls the user equipment apparatus to perform the procedure illustrated in FIGS. 6 and 18. An operation of the controller 2130 according to an embodiment of the present invention is described below.

The controller 2130 decodes data having a timestamp recorded therein received from the base station, and then calculates a delayed time period. When the delayed time period is longer than a particular threshold, the controller 2130 performs a control operation for transmitting, to the base station, a signal for reducing a threshold of a buffer. When the delayed time period is shorter than the particular threshold, the controller 2130 performs a control operation for transmitting, to the base station, a signal for increasing the threshold of the buffer.

Figure 22:
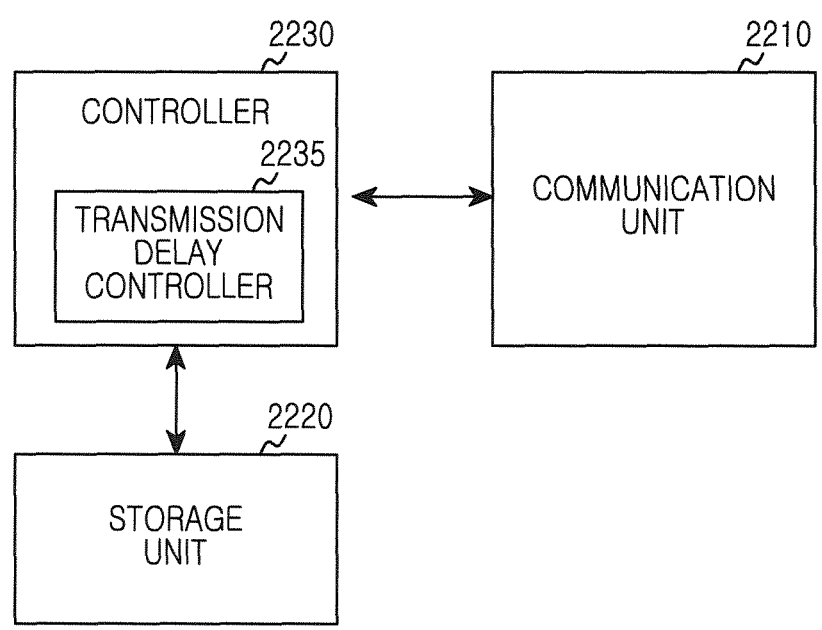
FIG. 22 illustrates a block configuration of a server apparatus for controlling transmission with an intermediate node as the center in a wireless communication system according to an embodiment of the present invention.

FIG. 22 illustrates a block configuration of a server apparatus for controlling transmission with an intermediate node as the center in a wireless communication system according to an embodiment of the present invention.

Referring to FIG. 22, the server apparatus includes a communication unit 2210, a storage unit 2220, a controller 2230, and a transmission delay controller 2235.

The communication unit 2210 performs a function of transmitting/receiving a signal. Particularly, the communication unit 2210 may perform communication between a base station and the controller 2230, and communication between the controller 2230 and the storage unit 2220. Accordingly, the communication unit 2210 may be referred to as a transmitter, a receiver, or a transmitter/receiver.

The storage unit 2220 stores data, such as a basic program, an application program, setting information, and the like for an operation of the server apparatus. Particularly, the storage unit 2220 may store information related to a delay time period of data in a queue for each user equipment of a server. Also, the storage unit 2220 provides data stored therein according to a request of the controller 2230.

The controller 2230 controls an overall operation of the server apparatus. According to an embodiment of the present invention, the controller 2230 includes the transmission delay controller 2235. For example, the transmission delay controller 2235 controls the server apparatus to perform the procedure illustrated in FIGS. 7 and 19. An operation of the controller 2230 according to an embodiment of the present invention is described below.

The controller 2230 calculates an average queueing delay time period for each user equipment. The controller 2230 calculates an average time period during which data stays in a queue of the server, and compares the time period, during which the data stays in the queue, with a required delay amount for each service. When the time period during which the data stays in the queue is longer than the required delay amount for each service, the controller 2230 determines that the sojourn time period of the data is lasting for a long time period, and makes a request for increasing a buffer threshold for each user equipment so that the base station may receive a larger amount of data. When the time period during which the data stays in the queue is shorter than the required delay amount for each service, the controller 2230 determines that the sojourn time period of the data in the server is short, and requests the base station to reduce the buffer threshold for each user equipment.

Methods according to claims of the present invention or embodiments described in the specification of the present invention may be implemented in the form of hardware, software, or a combination of hardware and software.

When the methods are implemented in software, a computer-readable storage medium that stores one or more programs (software modules) may be provided. The one or more programs stored in the computer-readable storage medium may be configured for execution by one or more processors within an electronic device. The one or more programs may include instructions which cause the electronic device to perform the methods according to the claims of the present invention or the embodiments described in the specification of the present invention.

The programs (software modules or software) may be stored in random access memories, non-volatile memories including flash memories, Read Only Memories (ROMs), Electrically Erasable Programmable Read Only Memories (EEPROMs), magnetic disc storage devices, Compact Disc-ROMs (CD-ROMs), Digital Versatile Discs (DVDs), other types of optical storage devices, or magnetic cassettes.

Alternatively, the programs may be stored in a memory configured by a combination of some or all of such storage devices. Also, each of the memories may be provided in plurality.

Further, the programs may be stored in an attachable storage device that can be accessed by the electronic device through a communication network such as the Internet, Intranet, Local Area Network (LAN), Wireless LAN (WLAN), or Storage Area Network (SAN), or through a communication network configured by a combination thereof. This storage device may be connected through an external port to the electronic device performing embodiments of the present invention. Alternatively, a separate storage device on a communication network may be connected to the electronic device performing embodiments of the present invention.

In the above-described specific embodiments of the present invention, the elements included in the present invention are expressed in a singular form or a plural form according to the proposed specific embodiment. However, the singular or plural expression is selected appropriately for a situation proposed for convenience of description, the present invention is not limited to a single element or multiple elements, and the elements expressed in a plural form may be configured as a single element or an element expressed in a singular form may be configured as multiple elements.

While the specific embodiments have been described in the detailed description of the present invention, it goes without saying that various changes in form and details may be made therein without departing from the scope of the present invention. Therefore, the scope of the present invention should not be defined as being limited to the described embodiments, but should be defined by the appended claims and equivalents thereof.

The invention claimed is:

1. An apparatus of an intermediate node in a wireless communication system, the apparatus comprising:
    a transceiver configured to receive information comprising a data delay time associated with a user equipment, wherein the data delay time includes a time period from a transmission of data by the intermediate node to a reception of the data by the user equipment; and
    at least one processor configured to determine a buffer threshold of a buffer in the intermediate node for the user equipment based on the information,
    wherein a transmission rate of the data is determined based on an amount of data in the buffer with respect to the buffer threshold and a measured signal round-trip time for a signal between the intermediate node and a server from which data for the user equipment originates,
    wherein the transmission rate of the data is decreased based on determining the amount of data in the buffer exceeds the buffer threshold,
    wherein the transmission rate of the data is increased based on determining the amount of data in the buffer is below the buffer threshold, and
    wherein the transceiver is further configured to transmit, to the server, a message for requesting the transmission rate for the data to be transmitted from the server.

2. The apparatus as claimed in claim 1, wherein the information comprises a channel quality indication (CQI) signal received from the user equipment, and wherein the CQI signal is used to determine a value of a modulation and coding scheme.

3. The apparatus as claimed in claim 2, wherein the at least one processor is configured to:
    increase the buffer threshold as the determined value of the modulation and coding scheme becomes larger; and
    update the buffer threshold if the value of the modulation and coding scheme is changed.

4. The apparatus as claimed in claim 1, wherein the at least one processor is configured to determine the buffer threshold in response to a sojourn time period during which data stays in the buffer.

5. The apparatus as claimed in claim 1, wherein the at least one processor is further configured to record a time at which data is enqueued within the intermediate node, and wherein the apparatus further comprises a transmitter configured to transmit, to the user equipment, the data having the time recorded therein.

6. The apparatus as claimed in claim 1, wherein the information comprises a request signal received from the user equipment, wherein the request signal includes:
    a request for reducing the buffer threshold for the user equipment if a difference between a time of receiving the data by the user equipment and a time at which data queues in the intermediate node is greater than a set value, or
    a request for increasing the buffer threshold for the user equipment if the difference between the time of receiving the data by the user equipment and the time at which the data queues in the intermediate node is less than the set value.

7. The apparatus as claimed in claim 1, wherein the information comprises a request signal received from the server, wherein the signal includes:
    a request for increasing the buffer threshold for the user equipment if a sojourn time period of data in the server is longer than a reference time period for the server, or
    a request for reducing the buffer threshold for the user equipment if the sojourn time period of the data in the server is shorter than the reference time period for the server.

8. The apparatus as claimed in claim 1, wherein the at least one processor is further configured to determine the transmission rate to request to the server, based on one or more of a storage amount of data stored in a buffer of the intermediate node or a priority of a service received from the user equipment.

9. The apparatus as claimed in claim 1, wherein the at least one processor is further configured to transmit the message requesting the transmission rate based on the measured signal round-trip time for the signal between the intermediate node and the server.

10. The apparatus as claimed in claim 9, wherein the at least one processor is configured to:
    transmit an acknowledgement (ACK) signal to the server;
    measure time until data corresponding to the ACK signal is received to determine the measured signal round-trip time between the intermediate node and the server; and
    adjust the transmission rate requested by the message to the server based on the measured signal round-trip time between the intermediate node and the server.

11. The apparatus as claimed in claim 10, wherein the at least one processor is configured to:
    divide the ACK signal;
    transmit the divided ACK signal to the server if a sojourn time period of data in the intermediate node is shorter than a particular value;
    duplicate the ACK signal;
    transmit the duplicated ACK signal to the server if the sojourn time period of the data in the intermediate node is longer than the particular value; and increase a number of divided ACK signals as the sojourn time period of the data in the intermediate node becomes shorter.

12. The apparatus as claimed in claim 9, wherein the at least one processor is further configured to adjust the transmission rate requested by the message to the server based on the measured signal round-trip time between the intermediate node and the server.

13. An apparatus of a user equipment in a wireless communication system, the apparatus comprising:
  a transceiver configured to receive data from an intermediate node configured to manage the user equipment; and
  at least one processor configured to generate information for determining a buffer threshold of a buffer in the intermediate node for the user equipment by using a data delay time associated with the user equipment, the data delay time including a time period from a transmission of data by the intermediate node to a reception of the data by the user equipment,
  wherein the buffer threshold for the user equipment is used to determine a transmission rate which the intermediate node requests from a server,
  wherein the transmission rate of the data is determined based on an amount of data in the buffer with respect to the buffer threshold and a measured signal round-trip time for a signal between the intermediate node and a server from which data for the user equipment originates,
  wherein the transmission rate of the data is decreased based on determining the amount of data in the buffer exceeds the buffer threshold, and
  wherein the transmission rate of the data is increased based on determining the amount of data in the buffer is below the buffer threshold.

14. An apparatus of a server in a wireless communication system, the apparatus comprising:
  a storage unit configured to store a measured signal round-trip time for a signal between an intermediate node and the server and a sojourn time period of data from the server through a queue for a user equipment within an intermediate node buffer in an intermediate node for the user equipment, wherein the user equipment is managed by the intermediate node; and
  at least one processor configured to:
    receive, from the user equipment, a message for requesting transmission rate for the data, and
    transmit, to the user equipment, the data based on the transmission rate,
  wherein the transmission rate is determined based on an amount of data in the intermediate node buffer with respect to a buffer threshold of the intermediate node buffer and the measured signal round-trip time,
  wherein the buffer threshold is determined based on a data delay time associated with a user equipment, the data delay time including a time period from a transmission of the data by the intermediate node to a reception of the data by the user equipment,
  wherein the transmission rate of the data is decreased based on determining the amount of data in the intermediate node buffer exceeds the buffer threshold, and
  wherein the transmission rate of the data is increased based on determining the amount of data in the intermediate node buffer is below the buffer threshold.

15. The apparatus of claim 14, wherein the sojourn time period of the data comprises information for a time when the data are stored in the intermediate node buffer in the intermediate node.

16. The apparatus of claim 13, wherein the time period corresponds to a difference between a time when the data are stored in the intermediate node buffer and a time when the data are received at the user equipment.

17. The apparatus of claim 13, wherein the at least one processor is further configured to:
  generate a signal for requesting to decrease the buffer threshold to a first value if the data delay time is greater than a predefined value, or
  generate a signal for requesting to increase the buffer threshold to a second value if the data delay time is less than the predefined value.

18. The apparatus of claim 14, wherein the at least one processor is further configured to generate a signal for:
  requesting to decrease the buffer threshold to a first value if a sojourn time period for the data in the intermediate node buffer is greater than a predefined value, or
  requesting to increase the buffer threshold to a second value if the sojourn time period is less than the predefined value.

* * * * *